(12) United States Patent
Bardman et al.

(10) Patent No.: US 8,822,569 B2
(45) Date of Patent: *Sep. 2, 2014

(54) COMPOSITE PARTICLES

(75) Inventors: James Keith Bardman, Green Lane, PA (US); Ward Thomas Brown, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 1413 days.

This patent is subject to a terminal disclaimer.

(21) Appl. No.: 11/363,438

(22) Filed: Feb. 27, 2006

(65) Prior Publication Data

US 2006/0223911 A1    Oct. 5, 2006

Related U.S. Application Data

(62) Division of application No. 10/174,158, filed on Jun. 18, 2002, now Pat. No. 7,081,488.

(60) Provisional application No. 60/299,701, filed on Jun. 20, 2001, provisional application No. 60/306,929, filed on Jul. 20, 2001, provisional application No. 60/311,207, filed on Aug. 9, 2001, provisional application No. 60/318,734, filed on Sep. 12, 2001, provisional application No. 60/325,382, filed on Sep. 26, 2001, provisional application No. 60/337,742, filed on Nov. 9, 2001, provisional application No. 60/377,395, filed on May 3, 2002.

(51) Int. Cl.

| | | |
|---|---|---|
| B01F 17/00 | (2006.01) | |
| B32B 5/16 | (2006.01) | |
| B32B 9/00 | (2006.01) | |
| B32B 9/04 | (2006.01) | |
| B32B 15/02 | (2006.01) | |
| B32B 17/02 | (2006.01) | |
| B32B 19/00 | (2006.01) | |
| B32B 21/02 | (2006.01) | |
| B32B 23/02 | (2006.01) | |
| B32B 27/02 | (2006.01) | |
| C08F 220/56 | (2006.01) | |
| C08K 3/00 | (2006.01) | |
| C08K 3/18 | (2006.01) | |
| C08K 3/22 | (2006.01) | |
| C08K 7/00 | (2006.01) | |
| C08K 9/00 | (2006.01) | |
| C08L 41/00 | (2006.01) | |
| C08L 43/00 | (2006.01) | |
| H01B 1/12 | (2006.01) | |

(52) U.S. Cl.
USPC .......... 523/200; 428/402; 428/403; 428/404; 428/405; 428/407; 428/411.1; 523/205; 523/220; 524/401; 524/431; 524/497; 524/547

(58) Field of Classification Search
USPC .......... 523/200, 205, 220; 524/401, 431, 497, 524/547; 428/403, 404, 405, 407, 411.1
See application file for complete search history.

(56) References Cited

U.S. PATENT DOCUMENTS

| | | |
|---|---|---|
| 3,449,303 A | 6/1969 | Caldwell et al. |
| 4,110,285 A | 8/1978 | Pons et al. |
| 4,433,124 A | 2/1984 | Okamoto et al. |
| 4,506,057 A | 3/1985 | Greene et al. |
| 4,733,005 A | 3/1988 | Schmidt et al. |
| 4,771,086 A | 9/1988 | Martin |
| 4,997,864 A | 3/1991 | Waters |
| 5,064,718 A | 11/1991 | Buscall et al. |
| 5,191,029 A | 3/1993 | DelDonno |
| 5,210,113 A | 5/1993 | Waters |
| 5,296,524 A | 3/1994 | Waters |
| 5,385,960 A | 1/1995 | Emmons et al. |
| 5,412,019 A | 5/1995 | Roulstone et al. |
| 5,509,960 A | 4/1996 | Simpson et al. |
| 5,534,585 A | 7/1996 | Roulstone et al. |
| 5,554,215 A | 9/1996 | Simpson et al. |
| 5,643,974 A | 7/1997 | Simpson et al. |
| 5,663,224 A | 9/1997 | Emmons et al. |

(Continued)

FOREIGN PATENT DOCUMENTS

| | | |
|---|---|---|
| AU | 592834 | 5/1987 |
| JP | 6042466 A | 3/1985 |

(Continued)

OTHER PUBLICATIONS

Van Herk A. M., "Encapsulation of Inorganic Particles," Polymeric Dispersions: Principles and Applications, 1997, pp. 435-450.
F. Wagener, "Suitable tests to ensure the economic use of titanium dioxide in emulsion paints," J. Oil Col. Chem. Assoc., 1968, 51, pp. 875-893.
M. J. Chen et al., "Phosphate Monomers as Adhesion Promoters and Latex Stabilizers," Proceedings of the Annual Meeting Technical Program of the FSCT, Oct. 2000, pp. 313-326.

Primary Examiner — Patrick Niland
(74) Attorney, Agent, or Firm — Karl E. Stauss; Cantor Colburn LLP

(57) ABSTRACT

A coating containing pigment particles and a polymer matrix is provided. The coating contains pigment particles that have a scattering coefficient with a linear or quasi-linear relationship to the pigment volume concentration of those pigment particles. The coating has improved hiding and is useful as a protective coating or an aesthetic coating on an underlying substrate. Also provided are compositions useful for preparing the coating, including covalently bonded composite particles and aqueous dispersions containing composite particles. The composite particles each contain a pigment particle with a plurality of polymer particles attached by adsorption on the outer surface of the pigment particle or by covalent bonding to the pigment particle through a coupling agent. Methods to prepare the composite particles and coating compositions containing the composite particles are also provided.

14 Claims, 1 Drawing Sheet

(56) References Cited

U.S. PATENT DOCUMENTS

| | | |
|---|---|---|
| 5,672,201 A | 9/1997 | Simpson et al. |
| 5,869,559 A | 2/1999 | Simpson et al. |
| 5,889,088 A | 3/1999 | Kisuno et al. |
| 5,952,404 A | 9/1999 | Simpson et al. |
| 5,998,507 A | 12/1999 | Adachi et al. |
| 6,080,802 A * | 6/2000 | Emmons et al. ............ 523/205 |
| 6,214,467 B1 * | 4/2001 | Edwards et al. ............ 428/407 |
| 7,081,488 B2 | 7/2006 | Bardman et al. |
| 7,179,531 B2 * | 2/2007 | Brown et al. ............ 428/407 |
| 2002/0069790 A1 | 6/2002 | Hayashi et al. |
| 2002/0096088 A1 | 7/2002 | Bardman et al. |

FOREIGN PATENT DOCUMENTS

| | | |
|---|---|---|
| WO | 9720001 A1 | 6/1997 |
| WO | 9925780 A1 | 5/1999 |
| WO | 0110946 A2 | 2/2001 |

* cited by examiner

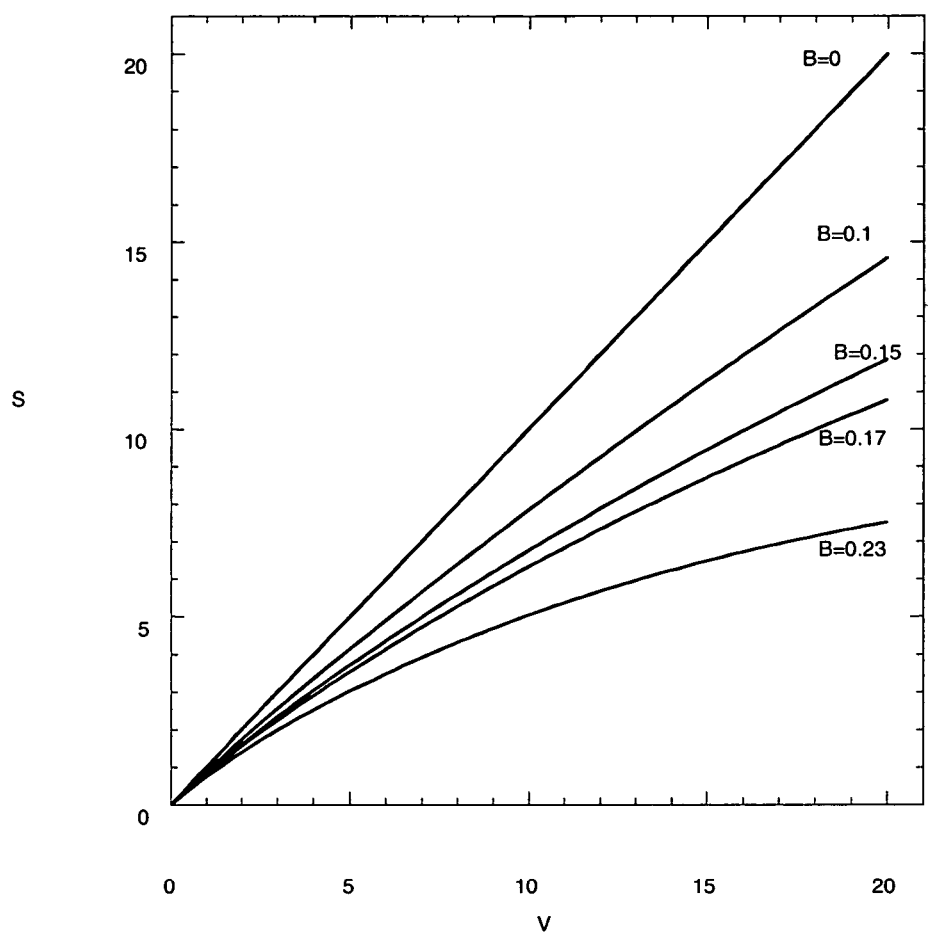

COMPOSITE PARTICLES

CROSS REFERENCE TO RELATED PATENT APPLICATIONS

This application is a division of U.S. Non-Provisional Patent Application Ser. No. 10/174,158 filed on Jun. 18, 2002, now U.S. Pat. No. 7,081,488, which claims the benefits of U.S. Provisional Patent Application Ser. Nos. 60/299,701 filed Jun. 20, 2001, 60/306,929 filed Jul. 20, 2001, 60/311,207 filed Aug. 9, 2001, 60/318,734 filed Sep. 12, 2001, 60/325,382 filed Sep. 26, 2001, 60/337,742 filed Nov. 9, 2001, and 60/377,395 filed May 7, 2002, which patent applications are fully incorporated herein by reference.

FIELD OF THE INVENTION

This invention relates generally to a coating containing opacifying pigment particles and a polymer matrix. More specifically, the invention relates to such a coating wherein the opacifying pigment particles have a light scattering coefficient with a linear or quasi-linear relationship to the volume concentration of the particles. The invention further relates to a coating wherein the opacifying pigment particles are composite particles, which are inorganic-organic particles containing an opacifying pigment particle with at least one polymer particle attached thereto. This invention still further relates to methods of preparing composite particles, and to a method of preparing coating compositions containing composite particles.

BACKGROUND OF THE INVENTION

Opacifying pigments provide whiteness, and opacity or "hiding", to opacifying coatings, such as paints. These pigments are present in all coatings that are designed to provide an opaque coating on and concealingly cover an undersurface or substrate surface to which the coating is applied. Opacifying pigments are absent from those coatings that are designed to be clear or transparent. Opacifying pigments are present in opacifying coatings, especially paints. In paints, the opacifying pigment is present irrespective of whether the paint is white or colored. The opacifying pigment of all paints is distinguished from the color specific pigments, also known as tinting agents or colorants, which are additionally present in colored paints. It is the color specific pigments that provide the specific color or tint to non-white paints.

It is desirable that opacifying coatings and paints have a high opacifying capacity so as to enable the coating or paint to completely conceal the undersurface, even if of a sharply contrasting color, while utilizing a minimal application of the coating or paint. It is highly desirable that complete covering of the undersurface is attained with a single application of the coating or paint, having the minimum possible thickness.

Opacifying coating and paint manufacturers have long sought to formulate opacifying coatings and paints having the desired opacity by maximizing the level of hiding for a defined level of opacifying pigment, in an attempt to approach the theoretical maximum hiding capability for a specific opacifying pigment, while minimizing the amount of opacifying pigment actually utilized.

The opacifying capacity or hiding power of an opacifying coating or paint is a measure of the coating's ability to conceal a surface to which the coating is applied. Opacifying capacity is a function of the spacing between the particles of opacifying pigment in the dried applied coating. Opacifying capacity of a coating is maximized when the light scattering capability of the opacifying pigment is maximized. Maximum light scattering efficiency occurs when the opacifying pigment particles have a certain diameter and spacing, so that the light scattering capability of each particle does not interfere with the light scattering capability of its neighboring particles. This condition may occur in coatings containing sufficiently low levels of opacifying pigment such that the individual opacifying pigment particles are isolated from each other. Coatings containing such low levels of opacifying pigment, however, do not provide sufficient whiteness and hiding at typical dried coating thicknesses. Achieving the desired levels of hiding and whiteness typically requires higher levels of opacifying pigment. At these higher levels, a statistical distribution of opacifying pigment particles occurs, which results in at least some of the opacifying pigment particles being in such close proximity to one another that there is a loss of light scattering efficiency due to crowding of the opacifying pigment particles.

Increased hiding efficiency is obtained by reducing the crowding of the opacifying pigment particles and minimizing the formation of clusters of opacifying pigment particles. One method uses polymer particles containing select chemical groups which promote adsorption to the opacifying pigment particle.

For example, U.S. Pat. No. 5,385,960 discloses an aqueous dispersion of composite particles, the composite particles each including a plurality of selected polymeric latex particles adsorbed to a titanium dioxide opacifying pigment particle. The selected polymeric latex particles have dihydrogen phosphate functional groups, which promote adsorption of the selected polymeric latex particles onto the surface of the titanium dioxide particles.

Although these composite particles provide improved hiding, there is still a need to increase the hiding efficiency provided by the opacifying pigment particles, and in particular, to obtain coatings which have hiding values at or near the maximum limit predicted by light scattering theory.

Theoretical hiding efficiency refers to the maximum level of hiding that may be obtained from a defined concentration of pigment particles and is characterized by a linear relationship between the scattering coefficient for the coating and the pigment concentration.

Titanium dioxide ($TiO_2$) is the most common opacifying pigment utilized in opacifying coatings and paints today. Accordingly, the present invention is described hereinafter in the context of the maximum opacifying capacity for titanium dioxide, which occurs at an optimum particle diameter of from about 200 to about 280 nanometers (nm), and when the particles are spaced apart from each other at distances on the order of a few particle diameters. It is to be understood, however, that the scope of the present invention is not limited to titanium dioxide as the opacifying pigment.

Titanium dioxide is the opacifying pigment of choice of most coatings manufacturers, particularly paint manufacturers, to provide whiteness, and opacity or "hiding", to the final dried coating. Titanium dioxide is, however, typically the most expensive raw material in a coating formulation. Heretofore, a number of techniques for minimizing the amount of $TiO_2$, while maximizing the level of hiding provided a certain amount of $TiO_2$ have been employed, including: (1) using titanium dioxide that has an optimal average particle size and particle size distribution for light scattering; and (2) using titanium dioxide that is well dispersed.

SUMMARY OF THE INVENTION

The present invention provides opacifying coatings having hiding values at or near theoretical hiding efficiency. These coatings are characterized as having opacifying pigment particles that have light scattering coefficients with linear or quasi-linear relationships to their pigment volume concentrations. An advantage of the coatings of the present invention is that for a desired level of hiding, these coatings contain lower levels of pigment and/or are applied at lower coat weights than coatings previously known in the art. The use of the coatings of the present invention enables the attainment of increased hiding levels.

According to a first aspect of the present invention, an opacifying coating is provided containing pigment particles having an average particle diameter of up to about 1 micron, a surface, and an index of refraction of at least 1.8; and a polymer matrix for at least partially containing the pigment particles; the pigment particles having a light scattering coefficient, S, described by the equation:

$$S = AV(1 - BV_{\mathit{eff}}^{1/3})$$

wherein: V is the pigment volume concentration of the pigment particles and is in the range of about 5 to about 40; $V_{\mathit{eff}}$ is the effective pigment volume concentration of the pigment particles; A is a constant with a value greater than 0; and B is a constant with a value in the range of from 0 to 0.15.

A second aspect of the present invention provides a composite particle including a pigment particle and a plurality of polymer particles, each one of the polymer particles containing at least one reacted complementary functional group forming a covalent bond with the pigment particle.

A third aspect of the present invention provides a composite particle including a pigment particle, a first plurality of polymer particles; and a second plurality of reacted coupling agents, such that each one of the reacted coupling agents is covalently bonded to the pigment particle and to a corresponding one of the first plurality of polymer particles.

A fourth aspect of the present invention provides a coating composition including a composite particle containing: a pigment particle, a first plurality of polymer particles, and a second plurality of reacted coupling agents, such that each one of the reacted coupling agents is covalently bonded to the pigment particle and to a corresponding one of the first plurality of polymer particles; and a binder.

A fifth aspect of the present invention provides a method for preparing a composite particle, wherein the composite particle contain a pigment particle and a first plurality of polymer particles attached to the pigment particle, the method including the steps of: admixing the pigment particle and a second plurality of molecules of a coupling agent, wherein each molecule of the coupling agent contains a first functional group for reacting with the pigment particle to form a first covalent bond therewith, and a second functional group for reacting with a complementary functional group to form a second covalent bond; forming a modified pigment particle by reacting or allowing to react the pigment particle and at least a portion of the first functional groups of the second plurality of molecules of the coupling agent, such that the modified pigment particle has a third plurality of molecules of the coupling agent with reacted first functional groups, covalently bonded thereto; admixing the modified pigment particle and the first plurality of polymer particles, each of the first plurality of polymer particles containing the complementary functional group; and forming the composite particle by reacting or allowing to react the second functional group of the third plurality of molecules of the coupling agent and the complementary functional group of the first plurality of polymer particles, forming a covalent bond therebetween, such that at least one of the first plurality of the polymer particles is covalently bonded to one of the third plurality of molecules of the coupling agent.

The second, third, fourth, and fifth aspects of this invention relate, respectively, to covalently bonded composite particles, a coating composition containing the covalently bonded composite particles, and a method of preparing the covalently bonded composite particles.

A sixth aspect of the present invention provides an aqueous polymer dispersion including polymer particles containing polymerized units of phosphorus acid monomer, and having first phosphorus acid groups; and an aqueous medium; such that the aqueous polymer dispersion is substantially free of water soluble polymer having second phosphorus acid groups.

According to a seventh aspect of the present invention, a composite particle dispersion is provided including composite particles, each of which contains a pigment particle having a surface, and a plurality of polymer particles containing polymerized units of phosphorus acid monomer, and having first phosphorus acid groups, wherein the plurality of polymer particles are adsorbed on the surface of the pigment particle; and an aqueous medium; wherein the composite particle dispersion is substantially free of water soluble polymer bearing second phosphorus acid groups and having a molecular weight of at least 40,000.

The aqueous polymer dispersion of the sixth aspect is suitable for preparing the composite particle composition of the seventh aspect.

An eighth aspect of the present invention provides a process for forming the composite particle composition of the seventh aspect of the invention. The process includes the steps of: preparing an aqueous composition including pigment particles and polymer particles having first phosphorus acid groups; wherein the polymer particles contain polymerized units of phosphorus acid monomer; and the aqueous composition is substantially free of water soluble polymer bearing second phosphorus acid groups and having a molecular weight of at least 40,000; and permitting the polymer particles to adsorb onto the pigment particles to form the composite particles.

In a ninth aspect of the present invention, a coating is provided including composite particles; wherein each of the composite particles contains a pigment particle having a surface; and a plurality of polymer particles containing polymerized units of a phosphorus acid monomer and having first phosphorus acid groups, the plurality of polymer particles being adsorbed on the surface of the pigment particle; such that the composite particles are formed by admixing the pigment particles and the plurality of polymer particles in an aqueous medium; wherein the aqueous medium is substantially free of water soluble polymer having second phosphorus acid groups and a molecular weight of at least 40,000.

The sixth and seventh aspects of the present invention relate to compositions having aqueous mediums substantially free of water soluble polymer having second phosphorus acid groups. The eighth aspect of the present invention relates to a process for preparing the composition of the seventh aspect of the present invention. The ninth aspect relates to a coating prepared from the composition of the seventh aspect.

A tenth aspect of the present invention provides a process for preparing an aqueous dispersion containing polymer particles containing polymerized units of phosphorus acid monomer, the process including the steps of: adding a phosphorus acid monomer to an aqueous reaction medium; and polymerizing the phosphorus acid monomer at a pH of less than 2 to form the aqueous dispersion of the polymer particles.

An eleventh aspect of the present invention provides an aqueous dispersion including polymer particles that contain polymerized units of phosphorus acid monomer; wherein the polymer particles are prepared by polymerization of the phosphorus acid monomer in an aqueous reaction medium having a pH of less than 2.

In a twelfth aspect of the present invention, an aqueous composition is provided containing at least one composite particle that contains a pigment particle having an surface; and a plurality of polymer particles containing units of a phosphorus acid monomer that has been polymerized in an aqueous reaction medium having a pH of less than 2, and wherein the plurality of polymer particles are adsorbed on the surface of the pigment particle.

BRIEF DESCRIPTION OF THE DRAWINGS

FIG. 1 is a plot of light scattering coefficient for a species of pigment, S, as a function of the pigment volume concentration, V. The plot shows the relationship between light scattering coefficient and the pigment volume concentration for coatings having B values of 0, 0.1, 0.15, 0.17, and 0.23.

DETAILED DESCRIPTION OF THE INVENTION

Glossary of Terms

As used herein, the term "(meth)acrylate" refers to either acrylate or methacrylate and the term "(meth)acrylic" refers to either acrylic or methacrylic.

"Glass transition temperature" or "$T_g$" as used herein, means the temperature at or above which a glassy polymer undergoes segmental motion of the polymer chain. Glass transition temperatures of a polymer are estimated by the Fox equation [*Bulletin of the American Physical Society* 1, 3 Page 123 (1956)], as follows:

$$\frac{1}{T_g} = \frac{w_1}{T_{g(1)}} + \frac{w_2}{T_{g(2)}}$$

For a copolymer, $w_1$ and $w_2$ are the weight fraction of the two co-monomers, and $T_{g(1)}$ and $T_{g(2)}$ are the glass transition temperatures, in degrees Kelvin, of the two corresponding homopolymers. For polymers containing three or more monomers, additional terms ($w_n/T_{g(n)}$) are added. Alternatively, the $T_g$ of a polymer phase is calculated by using the appropriate values for the glass transition temperatures of homopolymers, which are found, for example, in "Polymer Handbook", edited by J. Brandrup and E. H. Immergut, Interscience Publishers. The values of $T_g$ reported herein are calculated based on the Fox equation.

As used herein, the term "covalent bond" refers to a bond between two atoms formed by sharing at least one pair of electrons and expressly excludes ionic bonds, hydrogen bonds, bonds formed by adsorption including chemical adsorption and physical adsorption, bonds formed from van der Waals bonds, and dispersion forces.

As used herein, the term "phosphorus acid group" refers to a phosphorus oxo acid having a POH moiety in which the hydrogen atom is ionizable or to the salt of the phosphorus oxo acid. In its salt or basic form, the phosphorus acid group has a metal ion or an ammonium ion replacing at least one acid proton. Examples of phosphorus acid groups include groups formed from phosphinic acid, phosphonic acid, phosphoric acid, pyrophosphinic acid, pyrophosphoric acid, partial esters thereof, and salts thereof.

First Aspect of the Invention

The coating of the present invention has an opacifying pigment contained in a polymer matrix. Optionally, the coating also contains one or more of extender particles and secondary pigment particles. The opacifying pigment is present as particles that are distributed within the polymer matrix. The opacifying pigment particles provide light scattering sites within the coating. The coating has at least one such opacifying pigment, the particles of which have a scattering coefficient with a linear or quasi-linear relationship to the pigment volume concentration of that pigment.

As used hereinafter, the terms "pigment", "type of pigment", "type of pigment particles", and "species of pigment particles" are used to refer to the various embodiments of primary opacifying pigment and particles thereof in the coating according to the present invention.

The shape of the pigment particles is not important and can be of any shape provided that the pigment particles scatter photons having wavelengths in the spectral region of from about 750 nm to about 300 nm, preferably in the visible spectral region of from about 700 nm to about 380 nm. Suitable shapes for the pigment particles include spherical shapes, such as a regular sphere, an oblate sphere, a prolate sphere, and an irregular sphere; cubic shapes such as a regular cube and a rhombus; plate-like shapes including a flat plate, a concave plate, and a convex plate; and irregular shapes. The pigment particles having spherical shapes preferably have average diameters in the range of from about 10 nm to about 1 micron, preferably in the range of from about 100 nm to about 500 nm, and more preferably, in the range of from about 200 nm to about 300 nm. Pigment particles having nonspherical shapes preferably have average diameters, defined as their maximum dimension, of up to about 1 micron, preferably up to about 500 nm, and more preferably up to about 300 nm. Information about the average diameters of pigment particles is typically provided by pigment particle suppliers.

The pigment particles are also characterized as having an index of refraction that is significantly greater than the index of refraction of the polymer matrix. Suitable pigment particles have an index of refraction of at least 1.8, preferably at least 1.9, and more preferably at least 2.0. The indices of refraction for various materials are listed in *CRC Handbook of Chemistry and Physics*, $80^{th}$ Edition, D. R. Lide, editor, CRC Press, Boca Raton, Fla., 1999, pages 4-139 to 4-146.

The pigment particles alternatively have a uniform composition, or a heterogeneous composition with two or more phases. Certain heterogeneous pigment particles have an inner core and surrounding shell structure wherein one type of pigment particle forms the core and another type of particle forms the shell. The core and shell heterogeneous pigment particles include core/shell particles having a shell completely or incompletely encapsulating the core; core/shell particles having more than one core; dipolar particles; and particles having multiple domains of one phase on the surface of the other phase. Pigment particles, such as titanium dioxide, can have at least one coating of one or more of silica, alumina, and zirconia. For example, certain embodiments of titanium dioxide particles suitable for use in coatings of the present invention have a coating of silica and a coating of alumina.

Suitable species of pigment particles include zinc oxide, antimony oxide, zirconium oxide, chromium oxide, iron oxide, lead oxide, zinc sulfide, lithopone, and forms of titanium dioxide such as anatase and rutile. Preferably, the pigment particles are selected from titanium dioxide and lead oxide. More preferably, the pigment particles are selected from rutile titanium dioxide and anatase titanium dioxide. Most preferably, the pigment particles are rutile titanium dioxide. A coating containing two different forms of a material, such as rutile and anatase titanium dioxide, is considered to have two different pigments.

In a coating containing two or more pigments, one pigment may have a scattering coefficient with a linear or quasi-linear relationship to the pigment volume concentration of that pigment, while the remaining pigment(s) have scattering coefficient(s) with relationship(s) that are neither linear nor quasi-linear with respect to their respective pigment volume concentration(s). Alternately, a coating may have a first pigment and a second pigment, each pigment having a linear or quasi-linear relationship to its respective pigment volume concentration.

The polymer matrix of the coating of the present invention is a continuous medium containing the pigment particles. The polymer matrix is alternatively a homopolymer, a copolymer, an interpenetrating network polymer, and a blend of two or more polymers or copolymers. Suitable polymer matrices include acrylic (co)polymers, vinyl acetate polymers, vinyl/acrylic copolymers, styrene/acrylic copolymers, polyurethanes, polyureas, polyepoxides, polyvinyl chlorides, ethylene/vinyl acetate polymers, styrene/butadiene polymers, polyester polymers, polyethers, and the like, and mixtures thereof. Generally, the polymer matrix provides the coating with properties such as adhesion to a substrate, gloss, abrasion resistance, and barrier properties such as moisture resistance and/or solvent resistance.

The polymer matrix is formed from a binder. The binder is a polymer or a pre-polymeric material. The polymer is alternatively provided in a liquid medium such as a solution polymer, an emulsion polymer, or a suspension polymer, or is provided as a solid, such as a polymer powder or an extrusion polymer. The binder may contain reactive groups, which upon formation of a film, crosslink to provide a crosslinked coating.

Alternatively, the polymer matrix is formed from a binder containing a polymer having reactive groups and a crosslinking agent which reacts with the reactive groups of the polymer. Conventional crosslinking agents such as, for example, polyaziridine, polyisocyanate, polycarbodiimide, polyepoxide, polyaminoplast, polyalkoxysilane, polyoxazoline, polyamine, and a polyvalent metal compound are used, providing that the crosslinking agent does not inhibit film formation. Typically, from 0 to about 25 weight % of the crosslinking agent is used, based on the dry weight of the polymer. In one embodiment, the polymer matrix is formed from a thermoplastic polymer and from 0 to about 1 weight % crosslinking agent, based on dry weight of the thermoplastic polymer. In a second embodiment, the polymer matrix is formed from a polymer having reactive groups and crosslinking agent in the range of from about 0.05 to about 25 weight %, more preferably in the range of from about 0.1 to about 20 weight %, and most preferably in the range of from about 1 to about 10 weight %, based on the dry weight of the polymer.

Polymers suitable as the binder are film forming at or below the application condition of the coating composition used to prepare the coating of this invention. The polymers should have glass transition temperatures in the range of from about −60° C. to about 80° C., as calculated by the Fox equation. The coating composition optionally contains coalescents or plasticizers to provide the polymers with effective film formation temperatures at or below the application temperature. The level of optional coalescent is in the range of from about 1 weight % to about 40 weight %, based on the weight of the polymer solids.

Alternatively, the binder is at least one pre-polymeric material which is cured to form the polymer matrix. A pre-polymeric material is a material which is cured to form a polymer. A coating according to the present invention that is made with a pre-polymeric binder is prepared by applying a coating composition, which contains pigment particles and at least one pre-polymeric material as the binder, onto a substrate and then polymerizing or crosslinking the at least one pre-polymeric material to form the polymer matrix. Examples of pre-polymeric materials are ethylenically unsaturated monomers and oligomers, and two-part crosslinking systems such as compositions containing isocyanate groups and alcohol groups.

The coating of this invention optionally contains extender particles. The extender particles have an index of refraction which is similar to the index of refraction of the polymer matrix, and do not significantly scatter light. Extender particles have an index of refraction of less than 1.8 and typically greater than or equal to 1.3. Extender particles are categorized as small extender particles, which have an average particle diameter of less than or equal to twice the average particle diameter of the pigment particles, and as large extender particles, which have an average particle diameter of greater than twice the average particle diameter of the pigment particles. In coatings containing more than one type of pigment particle having different average particle diameters, extender particles may be a small extender for one type of pigment particles and a large extender for a second type of pigment particles. Suitable extender particles include calcium carbonate, calcium sulfate, barium sulfate, mica, clay, calcined clay, feldspar, nepheline, syenite, wollastonite, diatomaceous earth, alumina silicates, non-film forming polymer particles, aluminum oxide, silica, and talc. Other examples of extenders include solid bead extenders, also known in the art as solid bead pigments, such as polystyrene and polyvinyl chloride beads.

The coating of this invention optionally contains secondary pigment particles. The secondary pigment particles have an index of refraction less than the index of refraction of the polymer matrix. Secondary pigment particles include pigment particles containing air voids, such as polymer particles containing air voids. The air void is characterized as having an index of refraction close to or equal to 1. The air void volume is considered part of the total pigment volume of the coating, while the polymer component is considered to be part of the volume of the extender particles. The index of refraction of the polymer component of the secondary pigment particles is similar to or equal to the index of refraction of the polymer matrix. Secondary pigment particles including microsphere pigments such as polymer particles containing one or more voids and vesiculated polymer particles are disclosed in U.S. Pat. Nos. 4,427,835; 4,920,160; 4,594,363; 4,469,825; 4,468,498; 4,880,842; 4,985,064; 5,157,084; 5,041,464; 5,036,109; 5,409,776; and 5,510,422.

The pigment particles, the extender particles, and the secondary pigment particles are defined herein according to their average particle diameters and indices of refraction as follows:

|                         | Index of Refraction | Average Particle Diameter                                        |
|-------------------------|---------------------|------------------------------------------------------------------|
| Pigment particle        | 1.8 or greater      | 1 micron or smaller                                              |
| small extender particle | 1.3 to less than 1.8| twice the average diameter of pigment particle or smaller        |
| large extender particle | 1.3 to less than 1.8| greater than twice the average diameter of pigment article       |
| secondary pigment particle | less than 1.3    | 1 micron or less                                                 |

The coating of this invention contains from about 5 to about 40 volume % pigment particles, preferably from about 6 to about 30 volume %, and more preferably from about 8 to about 25 volume %, based on the total volume of the coating. The coating contains from about 30 to about 95 volume % polymer matrix, preferably from about 35 to about 90 volume %, and more preferably from about 40 to about 85 volume %, based on the total volume of the coating. The coating contains from 0 to about 70 volume % extender particles, preferably from 0 to about 65 volume %, and more preferably from 0 to about 60 volume %, based on the total volume of the coating. The coating contains from 0 to about 20 volume % secondary pigment particles, preferably from 0 to about 17 volume %, and more preferably from 0 to about 15 volume %, based on the total volume of the coating.

The pigment volume concentration (PVC) of each type of pigment particles is the percentage of the volume occupied by the particles of that pigment, based on the total volume of the coating. For a coating containing one or more types of pigment particles, the PVC for a single type of pigment particles, $V_i$, is expressed by equation 1a:

$$V_i = 100 V_{p,i}/V_c \quad\quad 1a$$

where $V_{p,i}$ is the volume of that single type of pigment particles and $V_c$ is the total volume of the coating. The total volume of the coating is the sum of the volumes of all components of the coating including all the pigment particles, the secondary pigment particles, the polymer matrix, the small extender particles, and the large extender particles. The PVC is commonly reported without units or as a percentage. For example, a coating having a pigment occupying 20 volume % of the total volume of the coating has a PVC reported as 20 or 20%.

The effective PVC for a single type of pigment particles is the percentage of the volume occupied by that type of pigment particles, based on the volume of the coating without including the large extender particles. The effective pigment volume concentration for a single type of pigment particles, $V_{\text{eff},i}$, is expressed by equation 1b:

$$V_{\text{eff},i} = 100 V_{p,i}/(V_c - V_{le}) \quad\quad 1b$$

where $V_{le}$ is the volume of the large extender particles.

Hiding efficiency provided by a pigment in a coating is calculated from light scattering theory using the model described by Stieg in the *Official Digest*, 31(408), 52 (1959). This model calculates the Kubelka-Munk light scattering coefficient for that pigment, $S_i$, as a function of the PVC of the particles of that pigment, according to the equation 2:

$$S_i = A_i V_i (1 - B_i V_{\text{eff},i}^{1/3}) \quad\quad 2$$

where $A_i$ and $B_i$ are constants. A coating having a pigment that provides theoretical hiding efficiency for the particles of that pigment, has a light scattering coefficient, $S_i$, which is linearly proportional to $V_i$. In equation 2, pigment providing theoretical hiding efficiency has a $B_i$ value equal to zero. Pigment having a light scattering coefficient with a quasi-linear relationship to the pigment volume concentration has a $B_i$ value in the range of greater than 0 to 0.15, preferably in the range of greater than 0 to 0.14, and more preferably in the range of greater than 0 to 0.12. The scattering coefficient is commonly expressed in units of reciprocal length, such as mil$^{-1}$ (1 mil=25.4 microns).

The value of $B_i$ for a select type of pigment particles in a coating may be determined by measuring the Y-reflectance values of at least three coatings having constant composition except that the PVCs of the select pigment particles are different. A light scattering coefficient for each coating is calculated from the Y-reflectance value for that coating, $Y_j$, using equation 3:

$$S_j = C Y_j/(1-Y_j)^2 \quad\quad 3$$

where C is a constant. See, for example, F. W. Billmeyer and R. L. Abrams, *Journal of Paint Technology*, 45(579), page 6-23 (1973). Next, the value of $B_i$ for the select pigment particles is determined from the light scattering coefficients for the coatings, using equation 4:

$$S_j = A_i V_i (1 - B_i V_{\text{eff},i}^{1/3}) + K \quad\quad 4$$

The parameter K is a constant and includes the contribution to light scattering in the coating from sources other than the select pigment particles, such as other types of pigment particles, secondary pigment particles, and extender particles.

For example, Y-reflectance values are measured for a series of coatings containing titanium dioxide particles as the pigment particles, at PVCs of 10, 15, and 20. The coatings also contain an acrylic copolymer as the polymer matrix, and calcium carbonate as large extender particles at a volume concentration of 15. In this series of coatings, the volume of the large extender particles remains constant at 15, while the volume of the polymeric matrix is 75, 70, and 65 for the coatings having PVCs of 10, 15, and 20, respectively. The light scattering coefficients for the coatings are calculated from the Y-reflectance values according to equation 3. Next, values for $A_i$, $B_i$, and K are calculated from the light scattering coefficients according to equation 4.

Coatings Containing Composite Particles

The coating of this invention contains pigment particles, which are optionally in the form of composite particles. The composite particles each contain a single center pigment particle surrounded by a plurality of polymer particles. The polymer particles are attached to the surface of each pigment particle and minimize contact between adjacent pigment particles. Suitable composite particles include pigment particles having either complete or partial surface coverage of the pigment particle by the polymer particles, provided that the polymer particles sufficiently encapsulate the pigment particles to prevent contact between neighboring pigment particles.

The polymer particles contained in the composite particle typically have a weight average molecular weight, Mw, of at least about 50,000, preferably of at least about 250,000, and most preferably of at least about 500,000, as measured by gel permeation chromatography. The polymer particles may have an average particle diameter in the range of from about 10 nm to about 1 micron, preferably in the range of from about 75 nm to about 500 nm, and more preferably in the range of from about 80 nm to about 200 nm. However, for composite particles containing titanium dioxide as the pigment particle or other pigment particles of similar size, maximum hiding power is typically obtained with polymer particles having average diameters in the range of from about 40 nm to about 250 nm, preferably in the range of from about 50 nm to about 200 nm, and more preferably in the range of from about 80 nm to about 150 nm. The diameter of the polymer particles is measured by a quasi-elastic light scattering technique.

The glass transition temperature of the polymer particles is typically in the range of from about −60° C. to about 120° C. Preferably the polymer particles have glass transition temperatures of at least 20° C., more preferably at least 35° C., and most preferably at least 50° C.

The polymer particles are typically prepared by the addition polymerization of ethylenically unsaturated monomers. The polymer particles are provided with functional groups by polymerizing ethylenically unsaturated monomer that has a functional group or a precursor to a functional group, referred to herein as "first monomer". The first monomer is polymerized to prepare a homopolymer having functional groups, or alternatively, is polymerized in a mixture with at least one other ethylenically unsaturated monomer, referred to herein as "second monomer", to prepare a copolymer having functional groups. Alternatively, the polymer particles are prepared by polymerizing a first monomer having a group which is a precursor to a functional group. After polymerization of the polymer particle, the precursor group is converted to provide a functional group. Examples of precursor groups are alcohol groups, which are oxidized to either aldehyde groups or carboxylic acid groups, or carboxylic acid groups, which are reacted with aziridines to form amine groups.

Suitable first monomers include monomers having isocyanate groups, acetoacetoxy groups, aldehyde groups, epoxide groups, and strong acid groups, such as phosphorus acid groups, or salts of strong acid groups. Suitable second monomers include styrene, butadiene, α-methyl styrene, vinyl toluene, vinyl naphthalene, ethylene, propylene, vinyl acetate, vinyl versatate, vinyl chloride, vinylidene chloride, acrylonitrile, methacrylonitrile, (meth)acrylamide, various $C_1$-$C_{40}$ alkyl esters of (meth)acrylic acid; for example, methyl (meth) acrylate, ethyl (meth)acrylate, n-butyl (meth)acrylate, 2-ethylhexyl (meth)acrylate, cyclohexyl (meth)acrylate, n-octyl (meth)acrylate, n-decyl (meth)acrylate, n-dodecyl (meth) acrylate, tetradecyl (meth)acrylate, lauryl (meth)acrylate, oleyl (meth)acrylate, palmityl (meth)acrylate, and stearyl (meth)acrylate; other (meth)acrylates such as isobornyl (meth)acrylate, benzyl (meth)acrylate, phenyl (meth)acrylate, 2-bromoethyl (meth)acrylate, 2-phenylethyl (meth) acrylate, and 1-naphthyl (meth)acrylate, alkoxyalkyl (meth) acrylate, such as ethoxyethyl (meth)acrylate, mono-, di-, trialkyl esters of ethylenically unsaturated di- and tricarboxylic acids and anhydrides, such as ethyl maleate, dimethyl fumarate, trimethyl aconitate, and ethyl methyl itaconate; and carboxylic acid containing monomers, such as (meth)acrylic acid, itaconic acid, fumaric acid, and maleic acid.

The ethylenically unsaturated monomer alternatively also includes at least one multi-ethylenically unsaturated monomer effective to raise the molecular weight and crosslink the polymer particle. Examples of multi-ethylenically unsaturated monomers include allyl (meth)acrylate, tripropylene glycol di(meth)acrylate, diethylene glycol di(meth)acrylate, ethylene glycol di(meth)acrylate, 1,6-hexanediol di(meth) acrylate, 1,3-butylene glycol di(meth)acrylate, polyalkylene glycol di(meth)acrylate, diallyl phthalate, trimethylolpropane tri(meth)acrylate, divinylbenzene, divinyltoluene, trivinylbenzene, and divinyl naphthalene.

Suitable polymer particles containing functional groups include both polymer particles having a single polymer phase and more than one polymer phase. Polymer particles containing two or more phases have various morphologies including, for example, core/shell particles, core sheath particles, core/shell particles with shell phases incompletely encapsulating the core, core/shell particles with a multiplicity of cores, interpenetrating network particles, particles having a dipole morphology in which each phase forms separate but connected lobes, and particles having multiple domains on the surface of another polymer phase. Alternatively, the polymer particle has a non-spherical shape such as an ellipsoid or a rod-like shape. Preferably, the polymer particle is spherical. Polymer particles containing two or more phases may contain the functional groups in one or more phases provided the functional groups are in contact with the exterior of the polymer particle.

The polymer particles are prepared by any process which provides copolymerization of ethylenically unsaturated monomers. Suitable processes include suspension or emulsion polymerization, including for example, the processes disclosed in U.S. Pat. Nos. 5,356,968 and 5,264,530. The polymer particles are also prepared by solution polymerization followed by the conversion of the solution polymer to polymer particles by various methods known in the art. The polymerization process is typically conducted in the presence of water or an organic solvent. Emulsion polymerization techniques for preparing an aqueous dispersion of the polymer particles are well known in the polymer arts, and include multiple stage polymerization processes. Various synthesis adjuvants such as initiators, chain transfer agents, and surfactants are optionally utilized in the polymerization. Preferably, the polymer particles are prepared by aqueous emulsion polymerization.

Second and Third Aspects of the Invention

According to the second and third aspects of the invention, the composite particles have polymer particles that are covalently bonded either directly or indirectly to the surface of the pigment particle. Such a composite particle, referred to herein as a "covalently bonded composite particle", has polymer particles that are directly attached to the pigment particle by a covalent bond between the pigment particle and the polymer particle. Alternatively, the polymer particles are indirectly attached to the pigment particle through a linkage which has a covalent bond with the surface of the pigment particle and a second covalent bond with the polymer particle.

In the second aspect of the invention, the covalent bond with the surface of the pigment particle is formed by reacting polymer particles containing functional groups, referred to herein as "complementary functional groups", that are reactive with the surface of the pigment particle. In this aspect, the reacted complementary functional group forms a covalent bond with the surface of the pigment particle. Alternatively, in the third aspect, the covalently bonded composite particle is formed containing linkages between the pigment particle and the polymer particles. The linkage is from a select coupling agent having a first functional group that reacts to form a covalent bond with the surface of the pigment particle and a second functional group that reacts with the complementary functional group of the polymer particle to form a second covalent bond.

The covalently bonded composite particle is prepared from a pigment particle having a surface containing a substance selected from the group consisting of: metals, metal oxides, sulfides, salts, nonmetals, nonmetal sulfides, nonmetal oxides, and combinations thereof. The surface of the pigment particle is the native surface of the pigment particle. Alternatively, the surface of the pigment particle is a surface having a surface treatment thereon, which surface treatment provides a suitable surface for formation of covalent bonds. The covalent bond is formed with an atom on or at the surface of the pigment particle, including any optional coating or surface treatment. In the presence of water, the surface of the pigment particle typically has hydroxyl groups.

The polymer particles suitable for preparing covalently bonded composite particles have a complementary functional group that is capable of alternatively forming a covalent bond with the pigment particle and with a second functional group of a coupling agent. Suitable complementary functional groups include acetoacetoxy groups, 1,3-dicarbonyl groups, aldehydes, acids, amines, epoxides, isocyanates, thioranes, isothiocyanates, alcohols, carbodiimides, aziridines, haloalkanes, and halophenyls. According to one embodiment, the polymer particles contain, as polymerized units, first monomers selected from isocyanate monomers, such as isocyanato ethyl methacrylate, dimethyl meta-isopropenyl benzyl isocyanate; acetoacetoxy monomers, such as acetoacetoxy ethyl (meth)acrylate; aldehyde monomers, such as acrolein and methacrolein; amine monomers, such as t-butyl aminoethyl (meth)acrylate, dimethyl aminoethyl (meth)acrylate, aminobutyl (meth)acrylate, aminoethyl (meth)acrylate; aminopropyl (meth)acrylate; and oxazolidinoethyl (meth)acrylate; epoxy monomers, such as glycidyl (meth)acrylate; carboxylic acid monomers, such as (meth)acrylic acid, itaconic acid, fumaric acid, maleic acid, β-acryloxypropionic acid, ethacrylic acid, α-chloroacrylic acid, α-vinylacrylic acid, crotonic acid, α-phenylacrylic acid, cinnamic acid, chlorocinnamic acid, and β-styrylacrylic acid; hydroxy containing monomers, such as hydroxyalkyl (meth)acrylates including 2-hydroxyethyl (meth)acrylate and 3-hydroxypropyl (meth)acrylate; halogenated monomers, such as bromopropyl (meth)acrylate; and halomethyl-styrene.

The covalently bonded composite particle is formed by admixing the pigment particle with the polymer particles and reacting or allowing to react the complementary functional group of the polymer particles and the pigment particle. Optionally, the reaction is carried out in the presence of a catalyst. The reacted complementary functional group forms a covalent bond with the pigment particle. A reagent is optionally included to convert the complementary functional groups to more reactive groups. In one embodiment, the covalently bonded composite particles are formed by admixing the dry pigment particles into an aqueous dispersion containing the polymer particles.

In one embodiment, the covalently bonded composite particles are formed by preparing an aqueous dispersion containing the pigment particles and then admixing the aqueous pigment particle dispersion with an aqueous dispersion containing the polymer particles.

The complementary functional group that reacts to form the covalent bond of the composite particle with polymer particles attached to the surface of the pigment particle is selected from an aziridine, an epoxide, and a thiorane. The complementary functional group reacts with hydroxyl or sulfide groups bonded to an atom, M, on the surface of the pigment particle. The polymer particles are attached to the pigment particle by ether or thiol ether bonds. The connecting bonds are represented by the structural formula:

—C(X$_1$)H—C(X$_2$)H—Y—M— wherein:
X$_1$ is —OH, —SH, or —NH and X$_2$ is —H; and alternatively
X$_2$ is —OH, —SH, or —NH and X$_1$ is —H;
Y is O or S; and
M is an atom in the pigment particle and is selected from: Ti, Al, Zr, Si, Zn, Cr, Sn, Fe, C, and Pb.

The group —C(X$_1$)H—C(X$_2$)H— is the reacted complementary functional group attached to the polymer particle. Fourth and Fifth Aspects of the Invention Alternatively, the covalently bonded composite particle has polymer particles indirectly attached to the surface of the pigment particle through linkages, which are reacted coupling agents, and are bonded to atoms on or at the surface of the pigment particle by bonds selected from: ether bonds, thiol ether bonds, and siloxane ether bonds. The atom on or at the surface of the pigment particle is selected from the group consisting: of Ti, Al, Zr, Si, Zn, Cr, Sn, Fe, C, and Pb. The linkages are also bonded to the polymer particles by at least one group selected from: esters, amides, ethers, urethanes, thiol ethers, amines, and ureidos.

The covalently bonded composite particle having the polymer particles indirectly attached to the surface of the pigment particle through linkages is formed by admixing the pigment particle and a coupling agent. The coupling agent has a first functional group and a second functional group. The first functional group of the coupling agent reacts or is allowed to react with the pigment particle to form a modified pigment particle. The reacted first functional group of the coupling agent first forms a covalent bond with the pigment particle, thereby forming a modified pigment particle. Next, the modified pigment particle is admixed with the polymer particles, and the second functional group of the coupling agent, which is covalently bonded to the pigment particle, and the complementary functional groups of the polymer particle react or are allowed to react to form the covalently bonded composite particle. The reaction of the second functional group of the coupling agent and the complementary functional group of the polymer particle similarly forms a covalent bond. In such an embodiment, the polymer particles are attached to the surface of the pigment particle by linkages, which are molecular chains forming covalent bonds with the surface of the pigment particle and second covalent bonds with the polymer particles. The linkages are formed by the reacted coupling agents.

The coupling agent typically has a molecular weight of less than about 10,000, preferably less than about 1,000, and most preferably less than about 500. The reacted coupling agent has a reacted first functional group that forms a covalent bond with the pigment particle and has a reacted second functional group that forms a covalent bond with the polymer particle. Alternatively, the coupling agent contains more than one first functional group, provided that the coupling agent is bonded to only one pigment particle. Alternatively, the coupling agent also contains more than one second functional group. For example, a coupling agent such as 3-aminopropyl-trimethoxysilane has three trimethoxysilane groups as the first functional groups. This coupling agent is capable of forming one, two, or three covalent bonds with the pigment particle. Similarly, the coupling agent alternatively contains more than one second functional group and is capable of alternatively forming more than one covalent bond with a single polymer particle, or forming multiple individual covalent bonds with two or more polymer particles. Suitable levels of coupling agent to form the composite particle include levels of from 0.1 to 50 equivalents of the second function group for each equivalent of complementary functional group.

Suitable first functional groups for attaching the coupling agent to the pigment particle include alkoxysilanes, acyloxysilanes, and silanols.

Second functional groups suitable for reaction with the complementary functional groups of the polymer particle include, for example, isocyanates and isothiocyanates, which react with a complementary functional group selected from alcohols, amines, ureas, and anhydrides; aldehyde groups, which react with a complementary functional group selected from acetoacetoxy groups and amines; acetoacetoxy groups, which react with a complementary functional group selected from aldehydes and amines; epoxides, thioranes, and aziridines, which react with a complementary functional group selected from alcohols, carboxylic acids, anhydrides, amines, and mercaptans; carbodiimides, which react with a complementary functional group selected from carboxylic acids, alcohols, amines, and mercaptans; haloalkane and halomethylphenyl groups, which react with a complementary functional group selected from amines and carboxylic acids; amines and thiols, which react with a complementary functional group selected from epoxides, aziridines, thioranes, acetoacetoxy groups, isocyanates, isothiocyanates, and carbodiimides; and carboxylic acids, which react with a complementary functional group selected from epoxides, aziridines, thioranes, and carbodiimides.

Examples of suitable coupling agents include: aminosilanes, such as 4-aminobutylmethyldiethoxysilane, N-(2-aminoethyl)-3-aminopropyldiethylisopropoxysilane, and 3-aminopropyltrimethoxysilane; epoxysilanes, such as (3-glycidoxypropyl)methyldimethoxysilane and 2-(3,4-epoxycyclohexyl)ethyltrimethoxysilane; mercaptosilanes, such as (mercaptomethyl)dimethylethoxysilane, 3-mercaptopropyltriisopropoxysilane, and di-4-mercaptobutyldimethoxysilane; (meth)acrylosilanes, such as 3-methacryloxypropyldimethylethoxysilane and 3-acryloxypropyltrimethoxysilane; haloalkylsilanes, such as 3-chloropropyltrimethoxysilane, 4-bromobutylmethyldibutoxysilane, and 5-iodohexyldiethylmethoxysilane; iso(thio)cyanatosilanes, such as 3-isocyanatopropyltrimethoxysilane and 3-isothiocyanatopropylmethyldimethoxysilane; alcohol-functional silanes, such as 3-hydroxybutylisopropyldimethoxysilane, bis(2-hydroxyethyl)-3-aminopropyltriethoxysilane; (propyltrimethoxysilane)sulfide terminated poly(hydroxyethylacrylate); halophenylsilanes, such as bromophenyltrimethoxysilane and (2-(iodophenyl)ethyl)ethyldimethoxysilane; halomethylphenylsilanes, such as bis(chloromethylphenyl)dimethoxysilane and bromomethylphenyldimethylisopropoxysilane; carbodiimidesilanes, such as bis(propyltrimethoxysilane)carbodiimide and N-ethyl-N'-(propylethoxydimethoxysilane)-carbodiimide; aldehyde-functional silanes, such as 3-(trimethoxysilyl) propanal and (propyltrimethoxysilane)sulfide terminated methylmethacrylate-acrolein copolymer; and 1,3-diketone functional silanes, such as (3,5-hexandione)triethoxysilane, 3-(trimethoxysilyl)propyl acetoacetate, and (butyltriethoxysilane)sulfide terminated methylmethacrylate-butyl acrylate-acetoacetoxyethyl methacrylate copolymer.

Any one of the group of reactions including the reaction between a suitable complementary functional group and the pigment particle; the reaction between the first functional group and the pigment particle; and the reaction between the second functional group and a suitable complementary functional group, is optionally conducted in the presence of a catalyst. For example, tertiary amines and tin salts are suitable catalysts for the reaction between an isocyanate group as the second functional group and an alcohol as the complementary functional group. The extent of reaction of the first functional group, the second functional group, and the complementary functional group is determined using conventional analytical techniques such as infrared spectroscopy, nuclear magnetic resonance spectroscopy, and ultraviolet-visible spectroscopy.

Composite Particles Containing Adsorbed Polymer Particles

Composite particles containing adsorbed polymer particles are useful for preparing coatings having theoretical or quasi-theoretical hiding. The polymer particles, which bear phosphorus acid groups or salts of phosphorus acid groups as functional groups, are adsorbed onto the surfaces of the pigment particles. The phosphorus acid groups are pendant to the polymer backbone and are referred to herein as "first phosphorus acid groups". The composite particles containing the polymer particles having first phosphorus acid groups are prepared from select processes and from select compositions.

The polymer particles having first phosphorus acid groups are addition polymers prepared by the polymerization of ethylenically unsaturated monomers including at least one phosphorus acid monomer and optionally, at least one second monomer.

The phosphorus acid monomer contains at least one ethylenic unsaturation and a phosphorus acid group. The phosphorus acid monomer is alternatively in the acid form or as a salt of the phosphorus acid group. Examples of phosphorus acid monomers include:

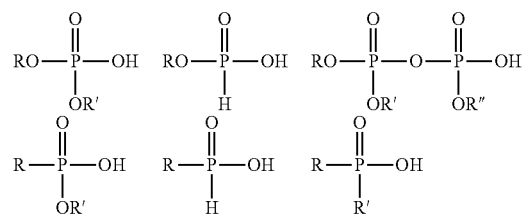

wherein R is an organic group containing an acryloxy, methacryloxy, or a vinyl group; and R' and R" are independently selected from H and a second organic group. The second organic group is alternatively saturated or unsaturated.

Suitable phosphorus acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxy-methyl) fumarate or itaconate, derivatives of (meth)acrylic acid esters, such as, for example phosphates of hydroxyalkyl(meth)acrylates including 2-hydroxyethyl (meth)acrylate, 3-hydroxypropyl (meth)acrylates, and the like. Other suitable phosphorus acid monomers are phosphonate functional monomers, such as are disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid. Further suitable phosphorus acid monomers are 1,2-ethylenically unsaturated (hydroxy)phosphinylalkyl (meth)acrylate monomers, such as are disclosed in U.S. Pat. No. 4,733,005, and include (hydroxy)phosphinylmethyl methacrylate.

Preferred phosphorus acid monomers are dihydrogen phosphate monomers, which include 2-phosphoethyl (meth) acrylate, 2-phosphopropyl (meth)acrylate, 3-phosphopropyl (meth)acrylate, and 3-phospho-2-hydroxypropyl (meth) acrylate.

In one alternative embodiment, the phosphorus acid monomer is treated prior to polymerization to remove impurities such as saturated compounds containing phosphorus acid groups and salts thereof. Examples of saturated compounds containing phosphorus acid groups include inorganic phosphates, phosphoric acid, phosphorous acid, and 2-hydroxy ethyl ester of phosphoric acid, and their salts.

The second monomer is an ethylenically unsaturated monomer that is not a phosphorus acid monomer. Suitable second monomers include styrene, butadiene, α-methyl styrene, vinyl toluene, vinyl naphthalene, ethylene, propylene, vinyl acetate, vinyl versatate, vinyl chloride, vinylidene chloride, acrylonitrile, methacrylonitrile, (meth)acrylamide, various $C_1$-$C_{40}$ alkyl esters of (meth)acrylic acid; for example, methyl (meth)acrylate, ethyl (meth)acrylate, n-butyl (meth) acrylate, 2-ethylhexyl (meth)acrylate, cyclohexyl (meth) acrylate, n-octyl (meth)acrylate, n-decyl (meth)acrylate, n-dodecyl (meth)acrylate, tetradecyl (meth)acrylate, lauryl (meth)acrylate, oleyl (meth)acrylate, palmityl (meth)acrylate, and stearyl (meth)acrylate; other (meth)acrylates such as isobornyl (meth)acrylate, benzyl (meth)acrylate, phenyl (meth)acrylate, 2-bromoethyl (meth)acrylate, 2-phenylethyl (meth)acrylate, and 1-naphthyl (meth)acrylate, alkoxyalkyl (meth)acrylate, such as ethoxyethyl (meth)acrylate, mono-, di-, trialkyl esters of ethylenically unsaturated di- and tricarboxylic acids and anhydrides, such as ethyl maleate, dimethyl fumarate, and ethyl methyl itaconate; and carboxylic acid containing monomers such as (meth)acrylic acid, itaconic acid, fumaric acid, and maleic acid. Alternatively, the second monomer includes at least one multi-ethylenically unsaturated monomer effective to raise the molecular weight and crosslink the polymer particle. Examples of multi-ethylenically unsaturated monomers that are utilizable include allyl (meth)acrylate, tripropylene glycol di(meth)acrylate, diethylene glycol di(meth)acrylate, ethylene glycol di(meth)acrylate, 1,6-hexanediol di(meth)acrylate, 1,3-butylene glycol di(meth)acrylate, polyalkylene glycol di(meth)acrylate, diallyl phthalate, trimethylolpropane tri(meth)acrylate, divinylbenzene, divinyltoluene, trivinylbenzene, and divinyl naphthalene.

The amounts and types of phosphorus acid monomer and second monomer are typically chosen to provide a coating composition with desired properties for the intended application.

The polymer particles having first phosphorus acid groups useful for preparing composite particles, which, in turn, are suitable for use in the coating of this invention, contain, as polymerized units, phosphorus acid monomer at levels in the range of from about 0.1 to about 10 weight %, preferably from about 0.5 to about 5 weight %, and more preferably from about 1 to about 3 weight %, based on the weight of the polymer particles having first phosphorus groups. The polymer particles contain at least one second monomer, as polymerized units, at levels in the range of from 90 to 99.9 weight %, preferably from 95 to 99.5 weight %, and more preferably, from 97 to 99 weight %, based on the weight of the polymer particles.

Sixth Aspect of the Invention

The polymer particles having first phosphorus acid groups are provided as an aqueous dispersion containing the polymer particles having first phosphorus acid groups dispersed in an aqueous medium. The aqueous medium is characterized as being substantially free of water soluble polymer having phosphorus acid groups. The water soluble polymer having phosphorus acid groups is an addition polymer containing at least two phosphorus acid groups that are alternatively independently located pendant to the backbone of the water soluble polymer and in a terminal position. As used herein, the phosphorus acid groups of the water soluble polymer having phosphorus acid groups are referred to as "second phosphorus acid groups". Contemplated are compositions in which the first phosphorus acid groups and the second phosphorus acid groups are the same, and compositions in which the first phosphorus acid groups and the second phosphorus acid groups are different. At a pH of 3 and above, the water soluble polymer having phosphorus acid groups is a component of the aqueous medium. The water soluble polymer having phosphorus acid groups is alternatively a homopolymer or a copolymer having a degree of polymerization of at least 2. The weight average molecular weight of the water soluble polymer having phosphorus acid groups is preferably at least 10,000, more preferably at least 25,000, and more preferably at least 40,000, as measured by aqueous gel permeation chromatography using a polyacrylic acid standard. In the aqueous polymer dispersion containing the polymer particles having first phosphorus acid groups, the term "substantially free of water soluble polymer" refers to levels of water soluble polymer having second phosphorus acid groups in the aqueous medium defined by ratios of equivalents of second phosphorus acid groups to equivalents of first phosphorus acid group in the range of less than or equal to 1.5, preferably less than or equal to 1, and more preferably, less than or equal to 0.75. In one embodiment, the lower limit for the level of water soluble polymer having second phosphorus acid groups in the aqueous medium is zero equivalents of second phosphorus acid groups.

Although not wishing to be limited to a particular theory, the inventors believe that the aqueous polymerization of phosphorus acid monomer to prepare an aqueous dispersion containing polymer particles having phosphorus acid groups also results in the formation of water soluble polymer having phosphorus acid groups. In the preparation of formulations containing composite particles from an aqueous dispersion of polymer particles having phosphorus acid groups, the water soluble polymer having phosphorus acid groups has an adverse effect on the hiding properties of coatings containing these composite particles. The water soluble polymer having phosphorus acid groups is believed to cause bridging flocculation of the pigment particles, which leads to a reduction in the hiding efficiency of the pigment particles in the dried coating. Reduction or elimination of the water soluble polymer having phosphorus acid groups allows the preparation of coatings with improved hiding.

The aqueous medium of the polymer dispersion containing polymer particles having first phosphorus acid groups optionally contains co-solvents including water miscible co-solvents such as methanol, ethanol, propanol, acetone ethylene glycol ethyl ethers, propylene glycol propyl ethers and diacetone alcohol; and water immiscible solvents such as propyl acetate, butyl acetate, methyl isoamyl ketone, amyl acetate, diisobutyl ketone, xylene, toluene, butanol, and mineral spirits. In one embodiment, the aqueous polymer dispersion has 0 weight % co-solvent in the aqueous medium and is referred to as "co-solvent-free". Suitable pH values for the aqueous medium are in the range of from 2 to 12.

The aqueous polymer dispersion, containing polymer particles having first phosphorus acid groups, is prepared by various processes including processes that remove the water soluble polymer having phosphorus acid groups from a composition containing the polymer particles having first phosphorus groups, and processes that prepare the polymer particles having first phosphorus groups while minimizing the concomitant formation of the water soluble polymer having phosphorus acid groups.

Various processes are suitable for removing the water soluble polymer having phosphorus acid groups from the aqueous polymer dispersion containing the polymer particles having first phosphorus acid groups. In one process, the polymer particles are phase separated from the aqueous medium and then the aqueous medium, including the water soluble polymer having phosphorus acid groups, is removed. Optionally the polymer particles are washed. Next, the polymer particles are re-dispersed into water. The process is optionally repeated one or more times, as needed, to provide the aqueous polymer dispersion of the sixth aspect of the invention. Other methods to separate the polymer particles from the aqueous medium include filtration and centrifugation. Other processes to remove the water soluble polymer having phosphorus acid groups from the aqueous medium include diafiltration, and contacting the aqueous medium with ion exchange resins and then removing the ion exchange resins.

Tenth and Eleventh Aspects of the Invention

The tenth aspect of the invention is directed towards a process for forming the aqueous polymer dispersion containing the polymer particles having first phosphorus groups that minimizes the formation of the water soluble polymer having phosphorus acid groups. In this process, the aqueous polymer dispersion containing the polymer particles having first phosphorus acid groups, according to the eleventh aspect of the invention, is prepared by an aqueous polymerization process at low pH. The low pH polymerization process includes the polymerization of phosphorus acid monomer in an aqueous reaction medium having a low pH. Although not wishing to be limited to a particular theory, the inventors believe that in an aqueous reaction medium at low pH, the phosphorus acid monomer is protonated and is less water soluble than at higher pH. Polymerization of the protonated phosphorus acid monomer leads to increased incorporation of the phosphorus acid monomer into the growing polymer particles and a reduction in the formation of the water soluble polymer having phosphorus acid groups in the aqueous reaction medium. As used herein, a low pH is a pH of less than 2, preferably less than or equal to about 1.7, and more preferably less than or equal to about 1.5. Suitable pH ranges for the low pH polymerization of the phosphorus acid monomer include pH values in the range of from about −1 to less than about 2, preferably from about −1 to less than about 1.8, and more preferably from about −1 to about 1.5. In one embodiment, the phosphorus acid monomer is polymerized at a pH in the range of from 0 to less than about 1.8, preferably in the range of from 0 to about 1.7, and more preferably in the range of from 0 to about 1.6. The pH of the aqueous reaction medium is adjusted to a low pH by the addition of strong acids, such as sulfuric acid; sulfurous acid; alkyl sulfonic acids, such as methyl sulfonic acid and alkyl ethylene oxide sulfonic acids; aryl sulfonic acids, such as benzosulfonic acid; dodecyl benzene sulfonic acid; and naphthalene sulfonic acid; sulfamic acid; hydrochloric acid; iodic acid; periodic acid; selenic acid; chromic acid; nitric acid; pyrophosphoric acid; trifluoroacetic acid; dichloroacetic acid; trichloroacetic acid; dihydroxymalic acid; dihydroxytartaric acid; maleic acid; oxalic acid; and trihydroxybenzoic acid. The strong acid is added to the aqueous reaction medium prior to the complete polymerization of the phosphorus acid monomer, including, for example, prior to the addition of the phosphorus acid monomer, during the addition of the phosphorus acid monomer, and both before and during the addition of the phosphorus acid monomer. Alternatively, the strong acid is added to the aqueous reaction medium after the addition of the phosphorus acid monomer, but prior to the polymerization of the phosphorus acid monomer.

The pH of the aqueous reaction medium is determined using a pH meter equipped with electrodes, such as silver chloride electrodes. The pH measurement is alternatively conducted on the aqueous reaction medium in the reaction vessel or is conducted on an aliquot of the aqueous reaction medium that has been removed from the reaction vessel. The pH measurement is made with the tested sample of the aqueous reaction medium at 20° C. The pH of the aqueous reaction medium is alternatively measured prior to, during, or after the polymerization of the phosphorus acid monomer. A pH measurement after the polymerization of the phosphorus acid monomer is made prior to the addition of substances that change the pH of the aqueous reaction medium.

Suitable aqueous emulsion polymerization processes for preparing the aqueous polymer dispersion containing the polymer particles having first phosphorus acid groups include single and multiple shot batch processes. If desired, a monomer mixture containing the phosphorus acid monomer is prepared and added gradually to the reaction vessel. Optionally, the monomer composition within the reaction vessel is varied during the course of the polymerization, such as by altering the composition of the monomers being fed into the reaction vessel. Optionally, the monomer mixture is pre-emulsified prior to addition to the aqueous reaction medium with the optional addition of surfactant to aid in the pre-emulsification of the monomer mixture. The monomer mixture optionally contains one or more other materials, including water, solvents, defoamers, and strong acids. The aqueous reaction medium optionally includes water miscible solvents, such as methanol, ethanol, propanol, acetone, ethylene glycol ethyl ethers, propylene glycol propyl ethers, and diacetone alcohol; and water immiscible solvents such as propyl acetate, butyl acetate, methyl isoamyl ketone, amyl acetate, diisobutyl ketone, xylene, toluene, butanol, and mineral spirits. Suitable polymerization processes, which include emulsion polymerization and suspension polymerization processes, are conducted as batch, semicontinuous, or continuous processes. Single or multiple stage polymerization techniques are suitable for the low pH process.

Temperatures suitable for the low pH aqueous emulsion polymerization process are in the range of from about 20° C. to less than about 100° C., preferably in the range of from about 40° C. to about 95° C., and more preferably in the range of from about 50° C. to about 90° C. The reaction vessel, containing an initial quantity of water and optionally other synthesis adjuvants, such as surfactants or acid, is typically preheated to a determined temperature prior to the addition of the monomer mixture. Typically, the aqueous reaction medium is agitated to promote mixing. The headspace of the reaction vessel is often flushed with nitrogen or another inert gas to minimize the level of oxygen in the reaction vessel.

The polymerization process for preparing the aqueous polymer dispersion having first phosphorus acid groups, according to the eleventh aspect of the invention, optionally employs a seed polymer emulsion to control the number of particles produced by the aqueous emulsion polymerization, as is known in the art. Suitable seed polymer emulsions include polymer emulsions having average particle diameters in the range of from about 10 nm to about 60 nm. Alternatively, the seed polymer particles are prepared by adding an initial quantity of a monomer emulsion to the aqueous reaction medium and polymerizing the added monomer. A technique to control the particle size of the polymer particles is by adjusting the initial surfactant charge, as is known in the art.

A polymerization initiator is typically added to the aqueous reaction medium to initiate polymerization of the ethylenically unsaturated monomers. The polymerization initiator can be added at any time, prior to the addition of the phosphorus acid monomer, after the addition of the phosphorus acid monomer, and during the addition of the phosphorus acid monomer. Examples of suitable polymerization initiators include polymerization initiators that thermally decompose at the polymerization temperature to generate free radicals. Examples include both water-soluble and water-insoluble species. Examples of suitable free radical-generating initiators include persulfates, such as ammonium and alkali metal (potassium, sodium, and lithium) persulfate; azo compounds, such as 2,2'-azobis(isobutyronitrile), 2,2'-azobis(2,4-dimethylvaleronitrile), and t-butyl azocyanocyclohexane; hydroperoxides, such as t-butyl hydroperoxide and cumene hydroperoxide; peroxides, such as benzoyl peroxide, caprylyl peroxide, di-t-butyl peroxide, ethyl 3,3'-di-(t-butylperoxy) butyrate, ethyl 3,3'-di(t-amulperoxy) butyrate, t-amylperoxy-2-ethyl hexanoate, and t-butylperoxy pivilate; peresters, such as t-butyl peracetate, t-butyl perphthalate, and t-butyl perbenzoate; as well as percarbonates, such as di(1-cyano-1-methylethyl)peroxy dicarbonate; and perphosphates.

Polymerization initiators are used alone, and alternatively, as the oxidizing component of a redox system, which also includes a reducing component, such as an acid selected from the group consisting of: ascorbic acid, malic acid, glycolic acid, oxalic acid, lactic acid, and thioglycolic acid; an alkali metal sulfite, more specifically a hydrosulfite, such as sodium hydrosulfite; a hyposulfite, such as potassium hyposulfite; and a metabisulfite, such as potassium metabisulfite; and sodium formaldehyde sulfoxylate.

Suitable levels of initiator and the optional reducing component include proportions of from about 0.001% to about 5% each, based on the weight of the monomers in the monomer mixture to be polymerized. Accelerators such as chloride and sulfate salts of cobalt, iron, nickel, and copper are generally used in small amounts. Examples of redox catalyst systems include t-butyl hydroperoxide/sodium formaldehyde sulfoxylate/Fe(II), and ammonium persulfate/sodium bisulfite/sodium hydrosulfite/Fe(II).

Chain transfer agents are optionally added to the aqueous reaction medium to control molecular weight of the polymer particle. Examples of chain transfer agents include mercaptans, polymercaptans, and polyhalogen compounds. Examples of suitable chain transfer agents include alkyl mercaptans, such as ethyl mercaptan, n-propyl mercaptan, n-butyl mercaptan, isobutyl mercaptan, t-amyl mercaptan, n-hexyl mercaptan, cyclohexyl mercaptan, n-octyl mercaptan, n-decyl mercaptan, n-dodecyl mercaptan; 3-mercaptoproprionic acid; 2-hydroxyethyl mercaptan; alcohols, such as isopropanol, isobutanol, lauryl alcohol, and t-octyl alcohol; and halogenated compounds, such as carbon tetrachloride, tetrachloroethylene, and trichlorobromoethane. Generally from 0 to about 10% by weight, based on the weight of the monomers in the monomer mixture, is used to prepare the polymer particles. Other techniques for controlling molecular weight, known in the art, include selecting the ratio of the initiator to total monomer amount.

Catalyst and/or chain transfer agent are optionally dissolved or dispersed in separate or the same fluid medium, and gradually added to the polymerization vessel. Monomer, either neat, dissolved, or dispersed in a fluid medium, is optionally added simultaneously with the catalyst and/or the chain transfer agent. Amounts of initiator and/or catalyst are optionally added to the aqueous reaction medium to "chase" residual monomer after polymerization has been substantially completed, so as to polymerize the residual monomer, as is well known in the polymerization arts.

The aqueous reaction medium typically contains surfactant to stabilize the growing polymer particles during polymerization and to discourage aggregation of the polymer particles in the resulting aqueous polymer dispersion. One or more surfactants, including anionic and nonionic surfactants, and mixtures thereof, is commonly used. Many examples of surfactants suitable for emulsion polymerization are given in *McCutcheon's Detergents and Emulsifiers* (MC Publishing Co. Glen Rock, NF), published annually. Other types of stabilizing agents, such as protective colloids, are optionally used. However, it is preferred that the amount and type of stabilizing surfactant or other type of stabilizing agent employed during the polymerization reaction be selected so that residual stabilizing agent in the resulting aqueous polymer dispersion does not significantly interfere with the properties of the aqueous polymer dispersion, the properties of compositions including the aqueous polymer dispersion, or articles prepared from the aqueous polymer dispersion.

Suitable anionic surfactants include, for example, alkali fatty alcohol sulfates, such as sodium lauryl sulfate; arylalkyl sulfonates, such as potassium isopropylbenzene sulfonate; alkali alkyl sulfosuccinates, such as sodium octyl sulfosuccinate; and alkali arylalkylpolyethoxyethanol sulfates or sulfonates, such as sodium octyl phenoxypolyethoxyethyl sulfate, having 1 to 5 oxyethylene units. Suitable nonionic surfactants include, for example, alkyl phenoxypolyethoxy ethanols having alkyl groups of from 7 to 18 carbon atoms and from 6 to 60 oxyethylene units, such as, for example, heptyl phenoxypolyethoxyethanols; ethylene oxide derivatives of long chained carboxylic acids, such as lauric acid, myristic acid, palmitic acid, oleic acid, or mixtures of acids, such as those found in tall oil, containing from 6 to 60 oxyethylene units; ethylene oxide condensates of long chained alcohols such as octyl, decyl, lauryl, or cetyl alcohols, containing from 6 to 60 oxyethylene units; ethylene oxide condensates of long chain or branched chain amines, such as dodecyl amine, hexadecyl amine, and octadecyl amine, containing from 6 to 60 oxyethylene units; and block copolymers of ethylene oxide sections combined with one or more hydrophobic propylene oxide sections. High molecular weight polymers, such as hydroxyethyl cellulose, methyl cellulose, and polyvinyl alcohol, are also usable.

The low pH polymerization process is suitable for preparing polymer particles having first phosphorus acid groups with average diameters in the range of from about 10 nm to about 1000 nm, preferably in the range of from about 20 nm to about 700 nm, and more preferably in the range of from about 60 nm to about 500 nm. The low pH polymerization process of this invention is suitable for preparing polymer particles having first phosphorus acid groups with molecular weights of at least about 10,000, preferably at least about 50,000, and more preferably at least about 100,000.

Suitable solids ranges for the aqueous dispersion prepared by the low pH polymerization process of this invention include from about 10 to about 70 weight % polymer particles having first phosphorus acid groups, based on the weight of the aqueous dispersion. After polymerization, the pH of the aqueous dispersion is typically adjusted to a pH in the range of from about 3 to about 10.

Suitable applications of the aqueous polymer dispersion containing polymer particles having first phosphorus acid groups dispersed in an aqueous medium, wherein the aqueous medium is substantially free of water soluble polymer having second phosphorus acid groups, include paper coatings; architectural coatings, such as interior and exterior house paints, wood coatings and metal coatings; coatings for leather; binders and coatings for textiles and nonwovens; adhesives; and traffic paints such as those paints used to mark roads, pavements, and runways.

Seventh and Eleventh Aspects of the Invention

The seventh aspect of the present invention is related to a composite particle composition prepared from the aqueous polymer dispersion containing polymer particles having first phosphorus acid groups. The composite particle composition contains composite particles dispersed in an aqueous medium. The aqueous medium is substantially free of water soluble polymer having second phosphorus acid groups and having select molecular weights. In this composite particle composition, the composite particles are formed in an aqueous medium substantially free of water soluble polymer having second phosphorus acid groups and a weight average molecular weight of at least 40,000, preferably at least 50,000, and more preferably at least 70,000.

Low pH aqueous emulsion polymerization of phosphorus acid monomer is a suitable method to prepare the aqueous polymer dispersion containing polymer particles having first phosphorus acid groups, according to the eleventh aspect of the invention, which is useful for preparing a composite particles composition. The low pH polymerization process minimizes the formation of water soluble polymer having second phosphorus acid groups, and particularly, water soluble polymer having second phosphorus acid groups and having a weight average molecular weight of at least 40,000, preferably at least 50,000, and more preferably at least 70,000.

Eighth Aspect of the Invention

The composite particle composition including the composite particles containing the polymer particles having first phosphorus acid groups and an aqueous medium substantially free of water soluble polymer having second phosphorus acid groups, is prepared by first admixing a first aqueous medium containing a dispersion of pigment particles, the aqueous polymer dispersion containing the polymer particles having first phosphorus acid groups dispersed in a second aqueous medium, and optionally dispersant, wherein the combined aqueous medium formed by mixing the first aqueous medium and the second aqueous medium is substantially free of water soluble polymer having second phosphorus acid groups. Next, the polymer particles having first phosphorus acid groups are allowed sufficient time to adsorb to the pigment particles to form the composite particles. The adsorption of the polymer particles having first phosphorus acid groups to the pigment particles is believed to be spontaneous and will continue until the occurrence of one of the following: the polymer particles having first phosphorus acid groups are completely adsorbed to the surfaces of the pigment particles; the surfaces of the pigment particles are completely covered with polymer particles having first phosphorus acid groups; or an equilibrium is achieved between adsorbed polymer particles having first phosphorus acid groups and polymer particles having first phosphorus acid groups remaining dispersed in the aqueous medium of the composite particle composition. The time required for the completion of adsorption typically depends upon one or more of the following parameters: the pigment particle type, the surface treatment of the pigment particle, dispersant type and concentration, the concentrations of the pigment particles and the polymer particles having first phosphorus acid groups, and temperature. The time required for the complete adsorption of the polymer particles to the pigment particles varies from instantaneously upon admixing of the first aqueous medium and the aqueous polymer dispersion to longer times, which are typically on the order of several hours in duration, such as from 6 to 12 hours, although still longer times of up to days or weeks may be required, depending on the above mentioned parameters. Where very long times are necessary for complete adsorption to occur, the composite particles so formed may be deemed not to be commercially viable. Pre-mixing the aqueous medium containing the pigment particles and the polymer particles having first phosphorus acid groups typically reduces the time for the completion of adsorption. For composites prepared with titanium dioxide particles as the pigment particles, adsorption of the polymer particles having first phosphorus acid groups typically requires about 4 to about 12 hours for complete adsorption. Low levels of other optional components are permissible in the aqueous medium during the formation of the composite particle, provided these components do not substantially inhibit or substantially interfere with the adsorption of the polymer particle having first phosphorus acid groups to the pigment particle. Examples of other components include co-solvents; wetting agents; defoamers; surfactants; biocides; other copolymers; and other pigments. Preferably the composite particle is formed in an aqueous medium in the absence of other co-polymers and other pigments. Optionally, the composite particle is prepared with levels of dispersant in the range of from 0 to about 2 weight %, preferably from 0 to about 1 weight %, and more preferably from 0 to about 0.5 weight %, based on the weight of the pigment particle. Suitable dispersants include anionic polyelectrolyte dispersants such as co-polymerized maleic acid, co-polymers including co-polymerized acrylic acid, co-polymers including co-polymerized methacrylic acid, and the like; and carboxylic acids containing molecules such as tartaric acid, succinic acid, and citric acid.

In a preferred embodiment, the polymer particles having first phosphorus acid groups are two-phase polymer particles having phosphorus groups in a single polymer phase. The two-phase polymer particles have one polymer phase with a glass transition temperature less than or equal to 40° C. and a second polymer phase with a glass transition temperature greater than 40° C. The difference between the glass transition temperatures of the two-polymer phases should be at least 10° C.

In the preparation of composite particles containing the polymer particles having first phosphorus acid groups, the first aqueous medium, the second aqueous medium, and, optionally, the dispersant, are admixed by adding the first aqueous medium to the second aqueous medium, and alternatively by adding the second aqueous medium to the first aqueous medium. The optional dispersant is added alternatively to the first aqueous medium, the second aqueous medium, and to the mixture of the first aqueous medium and the second aqueous medium. Mixing is typically provided to ensure that the pigment particles and the polymer particles having first phosphorus acid groups are distributed uniformly in the combined aqueous medium. It is preferred that the first aqueous medium containing the pigment particle dispersion or slurry is added to the second aqueous medium containing the polymer particles having first phosphorus acid groups, rather than vice versa, so that situations in which there is a temporary "excess" of pigment particles relative to the polymer particles having first phosphorus acid groups, and the possibility of grit formation through bridging flocculation of the polymer particles having first phosphorus acid groups due to an excess of pigment particles, are avoided.

Coating Compositions and Coatings Including the Fourth and Ninth Aspects of the Invention The select composite particles of the second, third, seventh, and twelfth aspects of the invention are suitable for preparing the coating of the first aspect of the invention. The coating is prepared from a coating composition containing the select composite particles and a binder. The coating composition is typically formed by first preparing the composite particles and then admixing the composite particles with binder. Next, the coating composition is applied onto a substrate and dried or allowed to dry, or cured or allowed to cure, to provide the coating of this invention. In one embodiment, the binder is a second polymer. Alternatively, the second polymer is provided as an aqueous polymer dispersion of second polymer particles. Preferably the aqueous polymer dispersion containing the second polymer particles is prepared by aqueous emulsion polymerization. Suitable second polymers include styrene butadiene polymers, styrene acrylate polymers, (meth)acrylate polymers, polyvinyl chloride polymers, ethylene vinyl acetate polymers, and vinyl acetate polymers. The second polymer particles generally have an average particle diameter in the range of from about 20 nm to about 1 micron, preferably from about 50 nm to about 600 nm, and more preferably from about 80 nm to about 500 nm.

Suitable coating compositions to prepare the coating according to the first aspect of the invention include coating compositions containing composite particles selected from covalently bonded composite particles and composite particles with adsorbed polymer particles having first phosphorus acid groups, in which the composite particles are formed in an aqueous medium substantially free of water soluble polymer having second phosphorus acid groups.

One embodiment provides coating compositions wherein the binder is the polymer particles in the composite particle which coalesce to form the polymer matrix.

In another embodiment, the binder is a prepolymeric material which is an ethylenically unsaturated material selected from an ethylenically unsaturated monomer, an ethylenically unsaturated oligomer, and mixtures thereof. In this embodiment, the coating of this invention is prepared by applying the coating composition onto a substrate and then initiating the polymerization of the ethylenically unsaturated material by exposing the coating composition containing the ethylenically unsaturated material to electromagnetic radiation such ultraviolet or visible radiation, to ionizing radiation such as gamma rays or X-rays, or electron beam irradiation, or by formulating the coating composition with a chemical initiator. Suitable ethylenically unsaturated materials include monoethylenically unsaturated monomers such as $C_1$ to $C_{40}$ alkyl (meth)acrylates, hydroxyalkyl esters of ethylenically unsaturated carboxylic acids, isobornyl (meth)acrylate, styrene and substituted styrenes, carboxylic acid containing ethylenically unsaturated monomers, vinyl chloride, vinylidene chloride; multi-ethylenically unsaturated monomers such as trimethylolpropane tri(meth)acrylate, trimethylolpropanepropoxylate tri(meth)acrylate, 1,6-hexanediol di(meth) acrylate, 1,3-butylene glycol di(meth)acrylate, ethoxylated bisphenol A di(meth)acrylates, pentaerythritolglycol di(meth)acrylate, pentaerythritol tri(meth)acrylate, tetraethyleneglycol di(meth)acrylate, melamine (meth)acrylate, diethyleneglycol di(meth)acrylate, neopentylglycol di(meth) acrylate, and triethyleneglycol tri(meth)acrylate; and ethylenically unsaturated oligomers such as polyether acrylates, epoxy-acrylates, polyester acrylates and polyurethane acrylates, (meth)acrylated acrylic oligomers fluorinated (meth) acrylated acrylic oligomers, polyamine acrylates; and $C_4$-$C_8$ alkane diol (meth)acrylates.

Acrylates are generally preferred over the corresponding methacrylate as acrylates typically cure at higher speeds. Coating compositions containing an ethylenically unsaturated material as the binder, typically contain a mixture of ethylenically unsaturated monomers or oligomers to provide the desired coating properties.

The coating composition containing ethylenically unsaturated material, which is cured by ultraviolet or visible radiation, preferably includes a photoinitiator in order initiate the polymerization and to accelerate the speed of the polymerization reaction. Useful photoinitiators are well known in the art and include free radical photoinitiators and cationic photoinitiators. Examples of free radical photoinitiators include benzophenone, 2,2-dialkyl-2-hydroxyacetophenone, 2-methylamino-2-benzyl-1-(4-morpholinophenyl)-butan-1-one, and acyl phosphines. Examples of cationic photoinitiators include aryldiazonium salts; diarylhalonium salts such as diaryliodonium, diarylbromonium, and diarylchloronium salts with complex metal halide anions; triarylsulfonium salts; nitrobenzyl esters; sulfones; and triaryl phosphates. Cure of the coating composition containing ethylenically unsaturated material using ionizing radiation, in particular, electron beam radiation, does not require a photoinitiator although the coating composition optionally contains a photoinitiator. Optionally, the coating composition containing ethylenically unsaturated material is cured in the presence of a chemical initiator such as peroxides or azoisobutyronitrile. These chemical initiators generate radicals which initiate the polymerization of the ethylenically unsaturated material. The chemical initiators decompose to form radicals at room temperature although an elevated temperature is often employed to achieve a faster rate of cure.

In one embodiment, the prepolymeric material is a reactive polymer or oligomer having alkoxysilane and/or acyloxysilane groups. The reactive polymer or oligomer is optionally formed from alkoxysilane monomer and/or acyloxysilane monomer with other silicon-free monomers. The prepolymeric material containing the alkoxysilane and/or acyloxysilane groups is crosslinked by a condensation reaction in the presence of moisture and, optionally, a catalyst. Examples of reactive polymers suitable as a prepolymeric material containing alkoxysilane and/or acryloxysilane groups are disclosed in U.S. Pat. Nos. 4,499,150 and 4,707,515.

Alternatively, the prepolymeric material useful as a binder is a two part curing system. The two part curing system includes a first component containing at least two reactive groups and a second component containing at least two complementary reactive groups which are reactive with the reactive groups of the first component. The second component is often referred to as a "curing agent". Suitable two part curing systems include, for example, epoxy resins with a curing agent selected from amine, carboxylic acid, anhydride, mercaptan, and hydroxyl containing curing agents; amino resins with a curing agent selected from hydroxyl, carboxylic acid, and amide containing curing agents; and isocyanate resins with a curing agent selected from hydroxyl, and amine containing curing agents. Suitable isocyanate resins include aliphatic and aromatic isocyanates. Blocked isocyanates are suitable as the isocyanate resin.

The coating composition containing the two part curing system optionally contains a catalyst to accelerate the crosslinking reaction between the reactive groups and the complementary reactive groups. In another embodiment, the coating is prepared from a powder coating composition. Powder coating compositions are well known in the art and are discussed in *Organic Coatings: Science and Technology, Vol. II*, Z. W. Wicks, Jr., F. N. Jones, and S. P. Pappas, John Wiley & Sons, Inc., 1994, Chap 31. A binder for a powder coating composition such as a thermosetting powder coating composition contains a first component, typically referred to as a primary resin and a second component, typically referred to as a hardener. Suitable binders include epoxy binders crosslinked with a material selected from dicyandiamide, modified dicyandiamide, and trimellitic anhydride hardeners; polyester binders containing hydroxyl and carboxylic acid groups, which are crosslinked with a material selected from triglycidyl isocyanurate, tetra(2-hydroxyalkyl)bisamide, blocked aliphatic isocyanates, and tetramethoxymethylglycoluril hardeners; acrylic binders containing epoxy groups which are crosslinked with dicarboxylic acids; and acrylic binders containing hydroxyl groups which are crosslinked with blocked isocyanates.

The coating of this invention is typically prepared by applying a coating composition to a substrate by conventional methods such as, for example, brushing, rolling, drawdown, dipping, with a knife or trowel, curtain coating, and spraying methods such as, for example, air-atomized spray, air-assisted spray, airless spray, high volume low pressure spray, and air-assisted airless spray. The wet coating thickness of the coating composition is typically in the range of from about 1 micron to about 250 microns. The coating composition is applied onto a substrate as a single coat or multiple coats. Preferably a single coat of the coating composition is applied. The coating is allowed to dry at ambient conditions, such as, for example, at from about 0° C. to about 35° C., and in the alternative, dried at elevated temperatures such as, for example, from about 35° C. to about 150° C.

In addition, the coating of this invention optionally includes other components, including without limitation, other polymers, surfactants, other pigments, extenders, dyes, pearlescents, adhesion promoters, crosslinkers, dispersants, defoamers, leveling agents, optical brighteners, ultraviolet stabilizers, absorbing pigments, coalescents, rheology modifiers, preservatives, biocides, and antioxidants.

The coating of this invention is suitable for application onto various substrates including wood; masonry; cementitious substrates such as concrete, stucco, mortar, and concrete substrates; stone; cellulosic substrates such as paperboard, wallpaper, wall board, and paper; glass; metal; asphalt; leather; plastics such as polyvinyl chloride; and woven and nonwoven material such as cloth, wool, synthetic and natural fibers, and textiles. In addition to providing a coating with improved hiding of the underlying substrate, the coating of this invention is suitable as a protective coating and in the alternative, as an aesthetic coating.

The coatings of the present invention are useful as architectural coatings, such as interior and exterior paint coatings, including masonry coatings, wood coatings and treatments; floor polishes; maintenance coatings such as metal coatings; paper coatings; and traffic coatings, such as those coatings used to provide markings on roads, pavements, and runways.

In one embodiment, the coating of this invention is a semi-gloss coating having 20° gloss values in the range of from about 10 to about 50, 60° gloss values in the range of from about 50 to about 80, and 85° gloss values in the range of from about 80 to about 95. The semi-gloss coating optionally contains, on a volume basis, from about 9 to about 15% pigment particles, from 0 to about 5% small extender particles, and from 0 to about 10% secondary pigment particles.

In another embodiment, the coating of this invention is a sheen coating having 20° gloss values in the range of from about 2 to about 10, 60° gloss values in the range of from about 10 to about 30, and 85° gloss values in the range of from about 10 to about 30. The sheen coating optionally contains, on a volume basis, from about 9 to about 15% pigment particles, from about 10 to about 20% large extender particles, and from 0 to about 10% secondary pigment particles.

In another embodiment, the coating of this invention is a flat coating having 20° gloss values in the range of from 0 to about 5, 60° gloss values in the range of from 0 to about 5, or 85° gloss values of from 0 to about 5. The flat coating optionally contains on a volume basis, from about 6 to about 12% pigment particles, from about 25 to about 40% large extender particles, and from 0 to about 15% secondary pigment particles.

EXAMPLES

The examples which follow illustrate the several aspects of the composition and the process of the present invention. These examples are intended to aid those skilled in the art in understanding the present invention. The present invention is, however, in no way limited thereby. The abbreviation "g" represents "grams". The abbreviation "mg" represents "milligrams".

Method to Determine Value of B for a Species of Pigment Particles in a Coating

The B value for a coating containing a particular species of pigment particles, which are at a pigment volume concentration (PVC) having a value represented by "V" in the coating, where the coating is referred to as "Coating-V", is determined by preparing a series of coatings including coatings having pigment volume concentrations for the species of pigment particles of 0.2V, 0.4V, 0.6V, 0.8V, and V. For those coatings having PVC values that are fractional values of V, the PVC's of any other species of primary pigments and secondary pigments, and the volume concentrations of extenders and dyes are maintained at the same levels as in Coating-V.

The coatings are prepared by combining the components of the coating compositions in the same order using the same method of preparation. All coating compositions have the same volume solids. The coating compositions are applied using a single type of applicator onto Opacity Charts (The Leneta Company, Form 3B) and are allowed to dry or cure under the identical conditions for the same period of time. The Opacity Charts have white and black sections.

The Y-reflectance value for each coating, $Y_j$, is measured over both the black and white sections of the chart using a colorimeter, such as a Pacific Scientific Colorguard Colorimeter (supplied by Gardner Ineotec, MD). The thickness of the coating must be large enough so that the Y-values measured over the black and white section of the chart are the same. If the Y-value for Coating-V is less than 0.75, the coating compositions for the series of coatings are tinted with 0.79 kg (1.75 lb) of Supronil™ HK Black Liquid (Clarient AG Corp., RI) per 378.5 liters (100 gallons) of the coating compositions.

The scattering coefficients for each coating, Sj, are calculated by using the equation $S=2.578Y_j/(1-Y_j)^2$, where Y is a number from 0-1. The value of B for the Coating-V is calculated by fitting the values of $S_j$ to equation 4.

Determination of the Level of Water Soluble Polymer Having Phosphorus Acid Groups To a centrifuge tube, 29.0 g of an aqueous polymer dispersion containing polymer particles bearing phosphorus acid groups was added. The sample was centrifuged at 50,000 rotations per minute (rpm) at a temperature of 15° C. for 2 hours. A portion of the serum phase was removed from the sample and dried at room temperature. A stock solution was prepared containing 0.05 g methyl phosphonic acid, 0.10 g ammonia (28%), and 4.85 g deuterated water ($D_2O$). The serum phase solids were dissolved in 1.0 g of the stock solution. The concentration of the water soluble polymer having phosphorus acid groups was determined using phosphorus-31 nuclear magnetic resonance spectroscopy (NMR) by calculating the ratio of the area of the broad peak for the water soluble polymer containing phosphorus acid groups at 4.7 ppm to the area of the peak for methyl phosphonate at 21.6 ppm.

Determination of the Level of Phosphorus Groups in the Polymer Particles

The equivalents of phosphorus acid groups in the polymer particles were determined from the equivalents of phosphorus acid monomer used in the preparation of the polymer particles, minus the equivalents of water soluble polymer having phosphorus acid groups, as determined by phosphorus-31 NMR.

Where the equivalents of phosphorus acid groups used in the preparation of the polymer particles were not known, the equivalents of phosphorus acid groups in the polymer particles were determined by first measuring the total equivalents of phosphorus acid groups in the aqueous polymer dispersion using atomic absorption spectroscopy, and then subtracting the equivalents of water soluble polymer having phosphorus acid groups, as determined by phosphorus-31 NMR.

Example 1

Preparation of Composite Particles with Covalently Bonded Polymer Particles

Example 1.1

Preparation of Composite Particles from Titanium Dioxide Particles and Isocyanate Functional Polymer Particles Composite particles having covalently bonded polymer particles were prepared by the reaction of isocyanate functional polymer particles and titanium dioxide particles functionalized with amine groups.

Preparation of Isocyanate Functional Polymer Particles

A 3-liter, four necked round bottom flask was equipped with a paddle stirrer, a thermometer, nitrogen inlet, and a reflux condenser. To the flask was added 1100 g deionized water. The deionized water was heated to a temperature of 85° C. under a nitrogen atmosphere. A mixture of 11.6 g sodium lauryl sulfate (SLS) (28% solids) in 10 g deionized water was added to the flask, followed by a mixture of 3.8 g sodium carbonate in 50 g deionized water. These additions were immediately followed by the addition of a solution of 3.9 g sodium persulfate in 50 g deionized water. After the addition of the sodium persulfate solution, a monomer emulsion (ME), which was prepared by mixing 320 g deionized water, 10 g SLS, 492.5 g butyl acrylate, 530.3 g methyl methacrylate, 43.2 g 3-isopropenyl-$\alpha,\alpha$-dimethylbenzyl isocyanate, and 14.0 g methacrylic acid, was added to the flask at a rate of 6 g/minute at a temperature of 85° C. for 30 minutes. After the 30 minutes, the feed rate was increased to 12 grams/minute. When the ME feed was complete, the reaction was held at a temperature of 85° C. for a period of 15 minutes and then the contents of the flask was cooled to room temperature and filtered to remove any coagulum. The dispersion containing the isocyanate functional polymer particles had a solids content of 38.5 weight %, an average particle diameter of 85 nm, and a pH of 6.0.

Preparation of Functionalized Pigment Particles

The titanium dioxide particles functionalized with amine groups were prepared by treating titanium dioxide particles with a coupling agent containing alkoxysilane groups as the first functional group and an amine group as the second functional group. The alkoxysilane groups were reacted with the titanium dioxide particles to attach the coupling agent to the titanium dioxide particles with covalent bonds.

A mixture of 95 g ethanol and 5 g water was placed in a grind pot which was then placed on a Premier Mill dispersator (manufactured by Premier Mill Corp., Reading, Pa.) equipped with a disk blade. To the grind pot, 400 g TiPure™ R-706 titanium dioxide (TiPure is a trademark of E.I. DuPont de Nemours and Company, Wilmington, Del.) was added with mixing. Next, the mixture was ground at 2000 rpm for a period of 15 minutes to disperse the titanium dioxide particles. The mill speed was decreased to gentle stirring, followed by the addition of 4 g of 3-aminopropyl-trimethoxysilane. The mixture was stirred for 1 hour. Next, the mixture was transferred to a plastic bucket and the ethanol and water were allowed to evaporate at room temperature to provide titanium dioxide particles functionalized with amine groups as the functionalized pigment particles.

The functionalized titanium dioxide particles were provided as an aqueous dispersion by first adding 75.0 g of water to a grind pot. Next, 300 g of the functionalized titanium dioxide particles were added to the grind pot with mixing using a Premier Mill dispersator equipped with a disk blade and ground at 2000 rpm for 20 minutes to provide the aqueous dispersion containing functionalized titanium dioxide particles.

Preparation of Composite Particles

Composite particles according to the present invention were prepared by adding dropwise 140 g of the aqueous dispersion containing the functionalized titanium dioxide particles, to 180 g of the isocyanate functional polymer particle dispersion, with mixing. The resulting composite particle dispersion was placed on a roller for at least 12 hours. The final composite particle dispersion had a solids level of 56.7 weight %. The composite particles contained 61.5 weight % titanium dioxide particles and 38.5 weight % polymer particles.

Example 1.2

Preparation of Composite Particles From Titanium Dioxide Particles and Acetoacetoxy Functional Polymer Particles Composite particles were prepared by the reaction of acetoacetoxy functional polymer particles and titanium dioxide particles functionalized with aldehyde groups.

Preparation of Aldehyde Containing Coupling Agent

A coupling agent containing an alkoxysilane group as the first functional group and an aldehyde group as a second functional group was prepared by first adding 75.0 g butyl acetate to a 250 ml round bottom flask equipped with a reflux condenser, magnetic stirrer, thermocouple, and a nitrogen inlet tube. The contents of the flask was swept with nitrogen and heated to a temperature of 88° C. Next, a solution of 0.05 g Vazo™ 67 initiator (Vazo is a trademark of E.I. DuPont de Nemours and Co., Wilmington, Del.) in 2.5 g butyl acetate was added to the flask. A monomer mixture, which contained 25 g butyl acetate, 12.5 g methyl methacrylate, 12.5 g hydroxyethyl methacrylate, and 0.8 g of 3-mercaptopropyltrimethoxysilane, was added dropwise to the flask in a 30 minute period. The contents of the flask was allowed to stand for a period of 15 minutes, and then the temperature was increased to 95° C. and maintained at a temperature of 95° C. for 40 minutes. The contents of the flask was then allowed to cool to room temperature and then 55.5 g anhydrous dimethyl sulfoxide was added, followed by the addition of 4.9 g diisopropylcarbodiimide and 1.1 g pyridine-hydrochloric acid dissolved in 5 g dimethylsulfoxide. The contents of the flask was allowed to sit for 72 hours. A white precipitate formed and was removed by filtration. The remaining mixture contained an alkoxysilane terminated co-oligomer of methylmethacrylate and 2-hydroxy acetaldehyde ester of methacrylic acid as an aldehyde functional alkoxysilane coupling agent at 9.8 weight % solids.

Preparation of Functionalized Pigment Particles

The titanium dioxide particles functionalized with aldehyde groups were prepared by treating titanium dioxide particles with a coupling agent containing alkoxysilane groups and an aldehyde group. The alkoxysilane groups were reacted with the titanium dioxide particles to attach the coupling agent to the titanium dioxide particles with covalent bonds.

A mixture of 95 g ethanol and 5 g water was placed in a grind pot which was then placed on a Premier Mill dispersator equipped with a disk blade. To the grind pot, 400 g TiPure™ R-706 titanium dioxide (TiPure is a trademark of E.I. DuPont de Nemours and Company) was added with mixing. The mixture was then ground at 2000 rpm for 20 minutes to disperse the titanium dioxide particles. Next, 80 g of the aldehyde functional alkoxysilane coupling agent was added, followed by the addition of 3 drops of hydrochloric acid. The mixture was ground for an additional 5 minutes. The mill speed was decreased to gentle stirring and the mixture was stirred for 25 minutes. The mixture was transferred to a plastic bucket and the ethanol and water were allowed to evaporate at room temperature to provide titanium dioxide particles functionalized with aldehyde groups as the functionalized pigment particles.

An aqueous dispersion containing the functionalized titanium dioxide particles was prepared by first adding 104.6 g water, 6.1 g Tamol™ 731 dispersant (Tamol is a trademark of Rohm and Haas Company, Philadelphia, Pa.), 6.9 g Colloid 643 dispersant (manufactured by Allied Colloids Limited Company, UK), and 1.1 g sodium hydroxide (50 weight % solution) to a grind pot. The contents of the grind pot was mixed using a Premier Mill dispersator equipped with a disk blade followed by the addition of 384 g of the aldehyde functional titanium dioxide particles. The mixture was ground at 2000 rpm for 20 minutes to provide the aqueous dispersion containing aldehyde functional titanium dioxide particles.

Preparation of Composite Particles

An aqueous dispersion containing the composite particles of this invention was prepared by adding dropwise and with mixing, 46.8 g of the aqueous dispersion containing the aldehyde functional titanium dioxide particles to 51.4 g of Rhoshield™ 3188 polymer dispersion (Rhoshield is a trademark of Rohm and Haas Company). Rhoshield™ 3188 polymer is an acetoacetoxy-functional polymer particle dispersion supplied at 40 weight % solids and has an average particle diameter of 120 nm. The resulting composite particle dispersion was placed on a roller for at least 12 hours prior to formulation into a coating composition. The resulting composite particle dispersion had a solids level of 56.6 weight %. The composite particles contained 63 weight % titanium dioxide particles and 37 weight % polymer particles.

Example 2

Preparation of Composite Particles with Adsorbed Polymer Particles

The following abbreviations are used in this example:

| | |
|---|---|
| surfactant-A | surfactant having an average composition of lauryl-(ethylene oxide)$_4$ sodium sulfate; 30 wt % solids |
| SLS | sodium lauryl sulfate; 28 wt % |
| ME-1 | first monomer emulsion |
| ME-2 | second monomer emulsion |
| ME-3 | third monomer emulsion |
| PEM | phosphoethyl methacrylate |

The ammonium hydroxide was at 28% solids.

Preparation of Phosphorus Acid Monomers

Preparation of Phosphorylated Caprolactone 2-(Methacryloyloxy)Ethyl Ester

The reactor was equipped with an agitator, a thermocouple, a reagent feeding line, an oxygen stream, and temperature control. To the reactor was added 47 g of polyphosphoric acid. The contents of the reactor was heated to a temperature of 65° C. with mixing. A mixture of 101 g of caprolactone 2-(methacryloyloxy)ethyl ester and 0.1 g of 4-methoxyphenol was added to the reactor over a period of 3 hours while maintaining the contents of the reactor at a temperature of 65° C. After the addition of the mixture, the contents of the reactor was maintained at a temperature of 65° C. for 19 hours with vigorous stirring. Next, the contents of the reactor was cooled to room temperature and 25 g of methyl methacrylate was added to the reactor. The resulting monomer contained 60 wt. % phosphorylated caprolactone 2-(methacryloyloxy)ethyl ester and 15 wt. % methyl methacrylate.

Preparation of Phosphorylated Hydroxybutyl Methacrylate

The reactor was equipped with an agitator, a thermocouple, a reagent feeding line, an oxygen stream, and temperature control. To the reactor was added 49 g of polyphosphoric acid. The contents of the reactor was heated to a temperature of 65° C. with mixing. A mixture of 68 g of hydroxybutyl methacrylate and 66 mg of 4-methoxyphenol was added to the reactor over a period of 3 hours while maintaining the contents of the reactor at a temperature of 65° C. After the addition of the mixture, the contents of the reactor was maintained at a temperature of 65° C. for 19 hours with vigorous stirring. Next, the contents of the reactor was cooled to room temperature and 20 g of methyl methacrylate was added to the reactor. The resulting monomer contained 63 wt. % phosphorylated hydroxybutyl methacrylate and 15 wt. % methyl methacrylate.

Preparation of Mono-Phosphonoethyl Methacrylate

The reactor was equipped with an agitator, a thermocouple, a reagent feeding line, an oxygen stream, and temperature control. To the reactor was added 98 g of pyrophosphoric acid, which was heated to a temperature of 65° C. A mixture of 130 g hydroxyethyl methacrylate and 0.1 g of 4-methoxyphenol was added to the reactor over a period of 3 hours. After the addition of the mixture, the contents of the reactor was maintained at a temperature of 65° C. for 17 hours with vigorous stirring. The contents of the reactor was cooled to room temperature and 16.4 g of methyl methacrylate was added. The resulting monomer contained 35 wt. % phosphonoethyl methacrylate and 15 wt. % methyl methacrylate.

Purification of Phosphoethyl Methacrylate

A sample of unpurified phosphoethyl methacrylate containing 20 weight % free phosphoric acid was purified by first adding 350 g of saturated sodium chloride solution (5.3 M NaCl), 200 g unpurified phosphoethyl methacrylate, and 270 g butyl acetate to a 1 liter separatory funnel. The mixture was shaken for 1 to 2 minutes and then allowed to separate into two phases. The lower aqueous phase was drained from the separatory funnel. The organic top phase was then transferred to a container. Next, 10 g magnesium sulfate was added to the organic phase and the organic phase was mixed for 10 minutes. The organic phase was then filtered to remove the magnesium sulfate. The butyl acetate was removed from the organic phase on a Buchii Rota-Evaporator to yield purified phosphoethyl methacrylate containing 1 weight % free phosphoric acid.

Preparation of Aqueous Dispersions

Aqueous dispersions containing polymer particles having first phosphorus acid groups were prepared. The reactor used to prepare these dispersions and comparative dispersion was a 3-liter, four necked round bottom flask equipped with a paddle stirrer, a thermometer, nitrogen inlet, and a reflux condenser.

Example 2.1

To the flask was added 800 g deionized water and 0.7 g concentrated sulfuric acid. The contents of the flask was heated to a temperature of 85° C. under a nitrogen atmosphere. A mixture of 5.0 g surfactant-A in 5 g deionized water was added to the flask followed by the addition of a mixture of 2.4 g sodium persulfate in 25 g deionized water. After the addition of the sodium persulfate solution, ME-1, which was prepared by mixing 260 g deionized water, 20 g surfactant-A, 132 g butyl acrylate, 444 g methyl methacrylate, 6.0 g acrylic acid, 18.0 g purified phosphoethyl methacrylate, and 5.0 g sulfuric acid, was added to the flask at a rate of 7.0 g/minute at a temperature of 85° C. When addition of the ME-1 was completed, the contents of the flask was held at a temperature of 85° C. for a period of 15 minutes to allow polymerization of the monomers, and then cooled to room temperature. Next, 16 g ammonium hydroxide was added to the flask and the contents of the flask was filtered to remove any coagulum. The resulting dispersion, containing the polymer particles, had a solids content of 33.0 weight %, an average particle diameter of 85 nm, and a pH of 9.0. The polymer particles had a glass transition temperature of 50° C.

Example 2.2

To the flask was added 800 g deionized water and 0.7 g concentrated sulfuric acid. The contents of the flask was heated to a temperature of 85° C. under a nitrogen atmosphere. A mixture of 3.0 g surfactant-A in 10 g deionized water was added to the flask, followed by the addition of ME-1, prepared by mixing 12 g deionized water, 1.0 g surfactant-A, 7.9 g butyl acrylate, 27.7 g methyl methacrylate, and 0.4 g methacrylic acid. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2 containing 170 g deionized water, 16.0 g surfactant-A, 124.1 g butyl acrylate, 416.3 g methyl methacrylate, 5.6 g acrylic acid, 18.0 g purified phosphoethyl methacrylate, and 5.0 g sulfuric acid was added to the flask at a rate of 7.5 g/minute at a temperature of 85° C. When addition of the ME-2 was complete, the contents of the flask was held at a temperature of 85° C. for a period of 15 minutes and then cooled to room temperature. Next, 16 g ammonium hydroxide was added to the flask and the contents of the flask was filtered to remove any coagulum. The resulting dispersion, containing the polymer particles, had a solids content of 35.0 weight %, an average particle diameter of 128 nm, and a pH of 8.6. The resulting aqueous polymer dispersion contained a ratio of second phosphorus acid group equivalents to first phosphorus acid group equivalents of less than 0.6.

Example 2.3

To the flask was added 800 g deionized water and 0.7 g concentrated sulfuric acid. The contents of the flask was heated to a temperature of 85° C. under a nitrogen atmosphere. A mixture of 3.0 g surfactant-A in 10 g deionized water was added to the flask, followed by the addition of ME-1, which was prepared by mixing 12 g deionized water, 1.0 g surfactant-A, 7.9 g butyl acrylate, 27.7 g methyl methacrylate, and 0.4 g methacrylic acid. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2, which contained 170 g deionized water, 16.0 g surfactant-A, 124.1 g butyl acrylate, 416.3 g methyl methacrylate, 5.6 g methacrylic acid, 18.0 g purified phosphoethyl methacrylate, and 5.0 g sulfuric acid, was added to the flask at a rate of 7.5 g/minute at a temperature of 85° C. When addition of the ME-2 was complete, the contents of the flask was held at a temperature of 85° C. for a period of 15 minutes and then cooled to room temperature. Next, 16 g ammonium hydroxide was added to the flask and the contents of the flask was filtered to remove any coagulum. The resulting dispersion, containing the polymer particles, had a solids content of 34.8 weight %, an average particle diameter of 145 nm, and a pH of 9.0.

Example 2.4

To the flask was added 800 g deionized water and 0.7 g concentrated sulfuric acid. The contents of the flask was heated to a temperature of 85° C. under a nitrogen atmosphere. A mixture of 3.0 g surfactant-A in 10 g deionized water was added to the flask, followed by addition of ME-1, which was prepared by mixing 12 g deionized water, 1.0 g surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2, which contained 170 g deionized water, 16.0 g surfactant-A, 124.1 g butyl acrylate, 422.0 g methyl methacrylate, 18.0 g purified phosphoethyl methacrylate, and 5.0 g sulfuric acid, was added to the flask at a rate of 7.5 g/minute at a temperature of 85° C. When addition of the ME-2 was complete, the contents of the flask was held at a temperature of 85° C. for a period of 15 minutes and then cooled to room temperature. Next, 16 g ammonium hydroxide was added to the flask and the contents of the flask was filtered to remove any coagulum. The resulting dispersion, containing the polymer particles, had a solids content of 35.6 weight %, an average particle diameter of 160 nm, and a pH of 8.9.

Example 2.5

To the flask was added 800 g deionized water and 0.7 g concentrated sulfuric acid. The contents of the flask was heated to a temperature of 85° C. under a nitrogen atmosphere. A mixture of 3.0 g surfactant-A in 10 g deionized water was added to the flask, followed by the addition of ME-1, which was prepared by mixing 12 g deionized water, 1.0 g surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2, which contained 170 g deionized water, 16.0 g surfactant-A, 124.1 g butyl acrylate, 422.0 g methyl methacrylate, 18.0 g purified phosphoethyl methacrylate, and 5.0 g sulfuric acid, was added to the flask at a rate of 7.5 g/minute at a temperature of 85° C. After addition of 75% of the ME-2, a solution of 5 g ammonium hydroxide and 10 g deionized water was added to the flask while continuing addition of the remaining ME-2. After complete addition of the ME-2, the contents of the flask was held at a temperature of 85° C. for a period of 15 minutes and then cooled to room temperature. Next, 11 g ammonium hydroxide was added and the contents of the flask was filtered to remove any coagulum. The resulting dispersion, containing polymer particles, had a solids content of 35.3 weight %, an average particle diameter of 110 nm, and a pH of 8.7.

Example 2.6

To the flask was added 800 g deionized water and 3.0 g concentrated sulfuric acid. The contents of the flask was heated to a temperature of 85° C. under a nitrogen atmosphere. A mixture of 3.0 g surfactant-A in 10 g deionized water was added to the flask, followed by addition of ME-1, which was prepared by mixing 12 g deionized water, 1.0 g surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2, which contained 80 g deionized water, 8.0 g surfactant-A, 66.0 g butyl acrylate, 216.0 g methyl methacrylate, and 18.0 g purified phosphoethyl methacrylate, was added to the flask at a rate of 7.5 g/minute at a temperature of 85° C. After complete addition of the ME-2, a solution of 4.0 g ammonium hydroxide and 10 g deionized water was added to the flask. Next, ME-3, which contained 80 g deionized water, 8.0 g surfactant-A, 72.0 g butyl acrylate, and 228.0 g methyl methacrylate, was fed to the flask at a rate of 12.5 g/minute. Upon complete addition of the addition of the ME-3, the contents of the flask was held at a temperature of 85° C. for a period of 15 minutes, and then cooled to room temperature. Next, 10 g ammonium hydroxide was added and the contents of the flask was filtered to remove any coagulum. The resulting dispersion, containing polymer particles, had a solids content of 36.4 weight %, an average particle diameter of 123 nm, and a pH of 8.9.

Example 2.7

To the flask was added 800 g deionized water and 3.0 g concentrated sulfuric acid. The contents of the flask was heated to a temperature of 85° C. under a nitrogen atmosphere. A mixture of 3.0 g surfactant-A in 10 g deionized water was added to the flask, followed by addition of ME-1, which was prepared by mixing 12 g deionized water, 1.0 g surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2, which contained 80 g deionized water, 8.0 g surfactant-A, 66.0 g butyl acrylate, 216.0 g methyl methacrylate, and 18.0 g purified phosphoethyl methacrylate, was added to the flask at a rate of 7.5 g/minute at 85° C. After complete addition of the ME-2, ME-3, which contained 80 g deionized water, 8.0 g surfactant-A, 72.0 g butyl acrylate, and 228.0 g methyl methacrylate, was fed to the flask at a rate of 12.5 g/minute. Upon complete addition of the addition of ME-3, the contents of the flask was held at a temperature of 85° C. for a period of 15 minutes and then cooled to room temperature. Next, 16 g ammonium hydroxide was added and the contents of the flask was filtered to remove any coagulum. The resulting dispersion, containing polymer particles, had a solids content of 36.3 weight %, an average particle diameter of 126 nm, and a pH of 9.2.

Example 2.8

To the flask was added 800 g deionized water and 3.0 g concentrated sulfuric acid. The contents of the flask was heated to a temperature of 85° C. under a nitrogen atmosphere. A mixture of 3.0 g surfactant-A in 10 g deionized water was added to the flask, followed by addition of ME-1, which was prepared by mixing 12 g deionized water, 1.0 g surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2, which contained 80 g deionized water, 8.0 g surfactant-A, 96.0 g ethyl acrylate, 186.0 g methyl methacrylate, and 18.0 g purified phosphoethyl methacrylate, was added to the flask at a rate of 7.5 g/minute at a temperature of 85° C. After complete addition of the ME-2, ME-3, which contained 80 g deionized water, 8.0 g surfactant-A, 72.0 g butyl acrylate, and 228.0 g methyl methacrylate, was then fed to the flask at a rate of 12.5 g/minute. Upon complete addition of the ME-3, the contents of the flask was held at a temperature of 85° C. for a period of 15 minutes and then cooled to room temperature. Next, 16 g ammonium hydroxide was added and the contents of the flask was filtered to remove any coagulum. The resulting dispersion, containing polymer particles, had a solids content of 36.4 weight %, an average particle diameter of 127 nm, and a pH of 9.4.

Example 2.9

To the flask was added 800 g deionized water and 3.0 g concentrated sulfuric acid. The contents of the flask was heated to a temperature of 85° C. under a nitrogen atmosphere. A mixture of 3.0 g surfactant-A in 10 g deionized water was added to the flask, followed by addition of ME-1, which was prepared by mixing 12 g deionized water, 1.0 g surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2 containing 80 g deionized water, 8.0 g surfactant-A, 66.0 g butyl acrylate, 212.8 g methyl methacrylate, and 21.2 g unpurified phosphoethyl methacrylate was added to the flask at a rate of 7.5 g/minute at a temperature of 85° C. After complete addition of ME-2, a solution of 4.0 g ammonium hydroxide and 10 g deionized water was added to the flask. Next, ME-3 containing 80 g deionized water, 8.0 g surfactant-A, 72.0 g butyl acrylate, and 228.0 g methyl methacrylate was added to the flask at a rate of 12.5 g/minute. Upon complete addition of the ME-3, the contents of the flask was held at a temperature of 85° C. for a period of 15 minutes and then cooled to room temperature. Next, 12 g ammonium hydroxide was added and the contents of the flask was filtered to remove any coagulum. The resulting dispersion containing polymer particles had a solids content of 34.4 weight %, an average particle diameter of 118 nm, and a pH of 9.0.

Example 2.10

To the flask was added 800 g deionized water and 3.0 g concentrated sulfuric acid. The contents of the flask was heated to a temperature of 85° C. under a nitrogen atmosphere. A mixture of 3.0 g surfactant-A in 10 g deionized water was added to the flask followed by the addition of ME-1, which was prepared by mixing 12 g deionized water, 1.0 g surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2, which contained 170 g deionized water, 16.0 g surfactant-A, 124.1 g butyl acrylate, 422.0 g methyl methacrylate, and 18.0 g purified phosphoethyl methacrylate, was added to the flask at a rate of 7.5 g/minute at a temperature of 85° C. After the complete addition of the ME-2, the contents of the flask was maintained at a temperature of 85° C. and then cooled to room temperature. Next, 16 g ammonium hydroxide was added and the contents of the flask was filtered to remove any coagulum. The resulting dispersion containing the polymer particles had a solids content of 36.0 weight %, an average particle diameter of 120 nm, and a pH of 9.5.

Example 2.11

To the flask was added 800 g deionized water and 3.0 g concentrated sulfuric acid. The contents of the flask was heated to a temperature of 85° C. under a nitrogen atmosphere. A mixture of 3.0 g surfactant-A in 10 g deionized water was added to the flask followed by the addition of ME-1, which was prepared by mixing 12 g deionized water, 1.0 g surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2, which contained 110 g deionized water, 10.5 g surfactant-A, 88.0 g butyl acrylate, 294.0 g methyl methacrylate, and 18.0 g purified phosphoethyl methacrylate, was added to the flask at a rate of 7.5 g/minute at a temperature of 85° C. After complete addition of the ME-2, a solution of 4.0 g ammonium hydroxide and 10 g deionized water was added to the flask. Next, ME-3, which contained 50 g deionized water, 5.5 g surfactant-A, 48.0 g butyl acrylate, and 152.0 g methyl methacrylate, was added to the flask at a rate of 12.5 g/minute. Upon complete addition of the ME-3, the contents of the flask was maintained at a temperature of 85° C. for a period of 15 minutes and then cooled to room temperature. Next, 10 g ammonium hydroxide was added and the contents of the flask was filtered to remove any coagulum. The resulting dispersion containing the polymer particles had a solids content of 35.5 weight %, an average particle diameter of 118 nm, and a pH of 9.5.

Example 2.12

To the flask was added 800 g deionized water and 3.0 g concentrated sulfuric acid. The contents of the flask was heated to a temperature of 85° C. under a nitrogen atmosphere. A mixture of 3.0 g surfactant-A having in 10 g deionized water was added to the flask followed by the addition of ME-1, which was prepared by mixing 12 g deionized water, 1.0 g of surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2, which contained 128 g deionized water, 12.8 g surfactant-A, 105.6 g butyl acrylate, 356.4 g methyl methacrylate, and 18.0 g purified phosphoethyl methacrylate, was added to the flask at a rate of 7.5 g/minute at a temperature of 85° C. After complete addition of the ME-2, a solution of 4.0 g ammonium hydroxide and 10 g deionized water was added to the flask. Next, ME-3, which contained 32.0 g deionized water, 3.2 g surfactant-A, 28.8 g butyl acrylate, and 91.2 g methyl methacrylate, was added to the flask at a rate of 12.5 g/minute. Upon complete addition of the ME-3, the contents of the flask was maintained at a temperature of 85° C. for a period of 15 minutes and then cooled to room temperature. Next, 10 g ammonium hydroxide was added and the contents of the flask was filtered to remove any coagulum. The resulting dispersion containing the polymer particles had a solids content of 35.4 weight %, an average particle diameter of 118 nm, and a pH of 9.4.

Example 2.13

To the flask was added 800 g deionized water and 3.0 g concentrated hydrochloric acid. The contents of the flask was heated to a temperature of 85° C. under a nitrogen atmosphere. A mixture of 3.0 g surfactant-A in 10 g deionized water was added to the flask followed by the addition of ME-1, which was prepared by mixing 12 g deionized water, 1.0 g of surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2, which contained 160 g deionized water, 16.0 g surfactant-A, 124.0 g butyl acrylate, 422.0 g methyl methacrylate, and 18.0 g purified phosphoethyl methacrylate, was added to the flask at a rate of 7.5 g/minute at a temperature of 85° C. After complete addition of the ME-2, the contents of the flask was maintained at a temperature of 85° C. for a period of 15 minutes and then cooled to room temperature. Next, 16 g ammonium hydroxide was added and the contents of the flask was filtered to remove any coagulum. The resulting dispersion containing the polymer particles had a solids content of 35.3 weight %, an average particle diameter of 128 nm, and a pH of 9.0.

Example 2.14

To the flask was added 800 g deionized water and 3.0 g concentrated sulfuric acid. The contents of the flask was heated to a temperature of 85° C. under a nitrogen atmosphere. A mixture of 3.0 g surfactant-A in 10 g deionized water was added to the flask followed by the addition of ME-1, which was prepared by mixing 12 g deionized water, 1.0 g of surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2, which contained 80 g deionized water, 8.0 g surfactant-A, 66.0 g butyl acrylate, 222.0 g methyl methacrylate, and 6.0 g purified phosphoethyl methacrylate, was added to the flask at a rate of 7.5 g/minute at a temperature of 85° C. After complete addition of the ME-2, a solution of 4.0 g ammonium hydroxide in 10 g deionized water was added to the flask. Next, ME-3, which contained 80 g deionized water, 8.0 g surfactant-A, 72.0 g butyl acrylate, and 228.0 g methyl methacrylate, was added to the flask at a rate of 12.5 g/minute. Upon complete addition of the ME-3, the contents of the flask was maintained at a temperature of 85° C. for a period of 15 minutes and then cooled to room temperature. Next, 12 g ammonium hydroxide was added and the contents of the flask was filtered to remove any coagulum. The resulting dispersion containing the polymer particles had a solids content of 35.7 weight %, an average particle diameter of 128 nm, and a pH of 9.5.

Example 2.15

To the flask was added 800 g deionized water and 3.0 g concentrated sulfuric acid. The contents of the flask was heated to a temperature of 85° C. under a nitrogen atmosphere. A mixture of 3.0 g surfactant-A in 10 g deionized water was added to the flask followed by the addition of ME-1, which was prepared by mixing 12 g deionized water, 1.0 g of surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2, which contained 80 g deionized water, 8.0 g surfactant-A, 27.0 g butyl acrylate, 255.0 g styrene, and 18.0 g purified phosphoethyl methacrylate, was added to the flask at a rate of 7.5 g/minute at a temperature of 85° C. After complete addition of the ME-2, a solution of 4.0 g ammonium hydroxide in 10 g deionized water was added to the flask. Next, ME-3, which contained 80 g deionized water, 8.0 g surfactant-A, 72.0 g butyl acrylate, and 228.0 g methyl methacrylate, was added to the flask at a rate of 12.5 g/minute. Upon complete addition of the ME-3, the contents of the flask was maintained at a temperature of 85° C. for a period of 15 minutes and then cooled to room temperature. Next, 10 g ammonium hydroxide was added and the contents of the flask was filtered to remove any coagulum. The resulting dispersion containing the polymer particles had a solids content of 35.5 weight %, an average particle diameter of 125 nm, and a pH of 9.0.

Example 2.16

To the flask was added 800 g deionized water and 0.7 g concentrated sulfuric acid. The contents of the flask was heated to a temperature of 85° C. under a nitrogen atmosphere. A mixture of 3.0 g surfactant-A in 10 g deionized water was added to the flask followed by the addition of ME-1, which was prepared by mixing 12 g deionized water, 1.0 g of surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2, which contained 80 g deionized water, 8.0 g surfactant-A, 66.0 g butyl acrylate, 216.0 g methyl methacrylate, 18.0 g purified phosphoethyl methacrylate, and 2.5 g concentrated sulfuric acid, was added to the flask at a rate of 7.5 g/minute at a temperature of 85° C. After complete addition of the ME-2, a solution of 4.0 g ammonium hydroxide in 10 g deionized water was added to the flask. Next, ME-3, which contained 80 g deionized water, 8.0 g surfactant-A, 72.0 g butyl acrylate, and 228.0 g styrene was added to the flask at a rate of 12.5 g/minute. Upon complete addition of the ME-3, the contents of the flask was maintained at a temperature of 85° C. for a period of 15 minutes and then cooled to room temperature. Next, 10 g ammonium hydroxide was added and the contents of the flask was filtered to remove any coagulum. The resulting dispersion containing the polymer particles had a solids content of 36.8 weight %, an average particle diameter of 114 nm, and a pH of 9.4.

Example 2.17

To the flask was added 800 g deionized water and 3.0 g concentrated sulfuric acid. The contents of the flask was heated to a temperature of 85° C. under a nitrogen atmosphere. A mixture of 3.0 g surfactant-A in 10 g deionized water was added to the flask followed by the addition of ME-1, which was prepared by mixing 12 g deionized water, 1.0 g of surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2, which contained 80 g deionized water, 8.0 g surfactant-A, 66.0 g butyl acrylate, 207.6 g methyl methacrylate, and 26.4 g phosphorylated caprolactone 2-(methacryloxyloxy)ethyl ester, was added to the flask at a rate of 7.5 g/minute at a temperature of 85° C. After complete addition of the ME-2, a solution of 4.0 g ammonium hydroxide in 10 g deionized water was added to the flask. Next, ME-3, which contained 80 g deionized water, 8.0 g surfactant-A, 72.0 g butyl acrylate, and 228.0 g methyl methacrylate, was added to the flask at a rate of 12.5 g/minute. Upon complete addition of the ME-3, the contents of the flask was maintained at a temperature of 85° C. for a period of 15 minutes and then cooled to room temperature. Next, 10 g ammonium hydroxide was added and the contents of the flask was filtered to remove any coagulum. The resulting dispersion containing the polymer particles had a solids content of 35.2 weight %, an average particle diameter of 118 nm, and a pH of 7.5.

Example 2.18

To the flask was added 800 g deionized water and 3.0 g concentrated sulfuric acid. The contents of the flask was heated to a temperature of 85° C. under a nitrogen atmosphere. A mixture of 3.0 g surfactant-A in 10 g deionized water was added to the flask followed by the addition of ME-1, which was prepared by mixing 12 g deionized water, 1.0 g of surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2, which contained 80 g deionized water, 8.0 g surfactant-A, 66.0 g butyl acrylate, 213.9 g methyl methacrylate, and 20.1 g phosphorylated hydroxybutyl methacrylate, was added to the flask at a rate of 7.5 g/minute at a temperature of 85° C. After complete addition of the ME-2, a solution of 4.0 g ammonium hydroxide in 10 g deionized water was added to the flask. Next, ME-3, which contained 80 g deionized water, 8.0 g surfactant-A, 72.0 g butyl acrylate, and 228.0 g methyl methacrylate, was added to the flask at a rate of 12.5 g/minute. Upon complete addition of the ME-3, the contents of the flask was maintained at a temperature of 85° C. for a period of 15 minutes and then cooled to room temperature. Next, 10 g ammonium hydroxide was added and the contents of the flask was filtered to remove any coagulum. The resulting dispersion containing the polymer particles had a solids content of 35.6 weight %, an average particle diameter of 131 nm, and a pH of 8.0.

Example 2.19

To the flask was added 800 g deionized water and 3.0 g concentrated sulfuric acid. The contents of the flask was heated to a temperature of 85° C. under a nitrogen atmosphere. A mixture of 3.0 g surfactant-A in 10 g deionized water was added to the flask followed by the addition of ME-1, which was prepared by mixing 12 g deionized water, 1.0 g of surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2, which contained 80 g deionized water, 8.0 g surfactant-A, 66.0 g butyl acrylate, 207.0 g methyl methacrylate, and 27.0 g mono-phosphonoethyl methacrylate, was added to the flask at a rate of 7.5 g/minute at a temperature of 85° C. After complete addition of the ME-2, a solution of 4.0 g ammonium hydroxide in 10 g deionized water was added to the flask. Next, ME-3, which contained 80 g deionized water, 8.0 g surfactant-A, 72.0 g butyl acrylate, and 228.0 g methyl methacrylate, was added to the flask at a rate of 12.5 g/minute. Upon complete addition of the ME-3, the contents of the flask was maintained at a temperature of 85° C. for a period of 15 minutes and then cooled to room temperature. Next, 10 g ammonium hydroxide was added and the contents of the flask was filtered to remove any coagulum. The resulting dispersion containing the polymer particles had a solids content of 34.1 weight %, an average particle diameter of 116 nm, and a pH of 8.7.

Example 2.20

To the flask was added 800 g deionized water and 3.0 g concentrated sulfuric acid. The contents of the flask was heated to a temperature of 85° C. under a nitrogen atmosphere. A mixture of 3.0 g surfactant-A in 10 g deionized water was added to the flask followed by the addition of ME-1, which was prepared by mixing 12 g deionized water, 1.0 g of surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for a period of 10 minutes to polymerize the added monomers. After 10 minutes, ME-2, which contained 80 g deionized water, 8.0 g surfactant-A, 66.0 g butyl acrylate, 213.0 g methyl methacrylate, 3.0 g allyl methacrylate, and 18.0 g purified phosphoethyl methacrylate, was added to the flask at a rate of 7.5 g/minute at a temperature of 85° C. After complete addition of the ME-2, a solution of 4.0 g ammonium hydroxide in 10 g deionized water was added to the flask. Next, ME-3, which contained 80 g deionized water, 8.0 g surfactant-A, 72.0 g butyl acrylate, and 228.0 g styrene, was added to the flask at a rate of 12.5 g/minute. Upon complete addition of the ME-3, the contents of the flask was maintained at a temperature of 85° C. for a period of 15 minutes and then cooled to room temperature. Next, 10 g ammonium hydroxide was added and the contents of the flask was filtered to remove any coagulum. The resulting dispersion containing the polymer particles had a solids content of 35.5 weight %, an average particle diameter of 123 nm, and a pH of 8.9.

Example 2.21

To the flask was added 800 g deionized water and 3.0 g concentrated sulfuric acid. The contents of the flask was heated to a temperature of 85° C. under a nitrogen atmosphere. A mixture of 3.0 g surfactant-A in 10 g deionized water was added to the flask followed by the addition of ME-1, which was prepared by mixing 12 g deionized water, 1.0 g of surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for a period of 10 minutes to allow polymerization of the added monomers. After 10 minutes, ME-2, which contained 40 g deionized water, 4.0 g surfactant-A, 33.0 g butyl acrylate, 104.9 g methyl methacrylate, 1.5 g allyl methacrylate, and 10.6 g unpurified phosphoethyl methacrylate, was added to the flask at a rate of 7.5 g/minute at a temperature of 85° C. After complete addition of the ME-2, a solution of 4.0 g ammonium hydroxide in 10 g deionized water was added to the flask. Next, ME-3, which contained 120 g deionized water, 12.0 g surfactant-A, 108.0 g butyl acrylate, and 342.0 g styrene, was added to the flask at a rate of 12.5 g/minute. Upon complete addition of the ME-3, the contents of the flask was maintained at a temperature of 85° C. for a period of 15 minutes and then cooled to room temperature. Next, 10 g ammonium hydroxide was added and the contents of the flask was filtered to remove any coagulum. The resulting dispersion containing the polymer particles had a solids content of 34.6 weight %, an average particle diameter of 120 nm, and a pH of 8.8.

Comparative Examples

Comparative aqueous dispersions containing polymer particles having phosphorus acid groups were prepared by aqueous emulsion polymerization of phosphorus acid monomer at a pH value of greater than 2. The comparative dispersions were prepared in the same reactor used to prepare the aqueous dispersions of Example 2.1 to 2.21.

Comparative Example C.1

To the flask was added 1800 g deionized water, which was then heated to a temperature of 80° C. under a nitrogen atmosphere. A mixture of 11.8 g sodium lauryl sulfate (SLS) in 10 g deionized water was added to the flask followed by a mixture of 6.0 g sodium persulfate in 60 g deionized water. After the addition of the sodium persulfate solution, ME-1, which contained 520.0 g deionized water, 53.6 g SLS, 330 g butyl acrylate, 1110.0 g methyl methacrylate, 15.0 g acrylic acid, and 45.0 g unpurified phosphoethyl methacrylate, was added to the flask at a rate of 18.3 g/minute at a temperature of 80° C. After complete addition of the ME-1, the contents of the flask was maintained at a temperature of 85° C. for a period of 15 minutes and then cooled to room temperature. Next, 25 g ammonium hydroxide was added and the contents of the flask was filtered to remove any coagulum. The resulting comparative dispersion, containing polymer particles, had a solids content of 37.1 weight %, an average particle diameter of 73 nm, and a pH of 8.1.

Comparative Example C.2

To the flask was added 800 g deionized water, which was then heated to a temperature of 85° C. under a nitrogen atmosphere. A mixture of 3.0 g surfactant-A in 10 g deionized water was added to the flask followed by the addition of ME-1, which contained 12 g deionized water, 1.0 g of surfactant-A, 7.9 g butyl acrylate, 27.7 g methyl methacrylate, and 0.4 g methacrylic acid. Following addition of the ME-1, a mixture of 2.4 g sodium persulfate in 20 g deionized water was added to the flask and the contents of the flask was held for 10 minutes to allow the polymerization of the monomers. After 10 minutes, ME-2, which contained 170 g deionized water, 16.0 g of surfactant-A, 124.1 g butyl acrylate, 416.3 g methyl methacrylate, 5.6 g acrylic acid, and 18.0 g purified phosphoethyl methacrylate, was added to the flask at a rate of 7.5 g/minute at a temperature of 85° C. After the completion of ME-2, the contents of the flask was maintained at a temperature of 85° C. for a period of 15 minutes and then cooled to room temperature. Next, 11 g ammonium hydroxide was added and the contents of the flask was filtered to remove any coagulum. The resulting comparative dispersion, containing polymer particles, had a solids content of 34.9 weight %, an average particle diameter of 110 nm, and a pH of 8.4. The resulting comparative aqueous polymer dispersion contained a ratio of equivalents of second phosphorus acid groups to equivalents of first phosphorus acid groups equal to 2.45.

Comparative Example C.3

To the flask was added 800 g deionized water, which was then heated to a temperature of 85° C. under a nitrogen atmosphere. A mixture of 3.0 g surfactant-A in 10 g deionized water was added to the flask followed by the addition of ME-1, which contained 12 g deionized water, 1.0 g of surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for 10 minutes to allow polymerization of the monomers. After 10 minutes, ME-2, which contained 80 g deionized water, 8.0 g surfactant-A, 96.0 g ethyl acrylate, 186.0 g methyl methacrylate, and 18.0 g purified phosphoethyl methacrylate, was added to the flask at a rate of 7.5 g/minute at a temperature of 85° C. After complete addition of the ME-2, ME-3, which contained 80 g deionized water, 8.0 g surfactant-A, 72.0 g butyl acrylate, and 228.0 g methyl methacrylate, was added to the flask at a rate of 12.5 g/minute. Upon complete addition of the ME-3, the reaction was maintained at a temperature of 85° C. for a period of 15 minutes and then cooled to room temperature. Next, 12 g ammonium hydroxide were added and the contents of the flask was filtered to remove any coagulum. The resulting comparative dispersion, containing polymer particles, had a solids content of 36.5 weight %, an average particle diameter of 112 nm, and a pH of 9.9.

Comparative Example C.4

To the flask was added 800 g deionized water, which was then heated to a temperature of 85° C. under a nitrogen atmosphere. A mixture of 3.0 g surfactant-A in 10 g deionized water was added to the flask followed by the addition of ME-1, which contained 12 g deionized water, 1.0 g of surfactant-A, 8.0 g butyl acrylate, and 28.0 g methyl methacrylate. Following addition of the ME-1, a mixture of 2.4 g sodium persulfate in 20 g deionized water was added to the flask and the contents of the flask was held for 10 minutes to allow polymerization of the monomers. After 10 minutes, ME-2, which contained 170 g deionized water, 16.0 g surfactant-A, 124.0 g butyl acrylate, 422.0 g methyl methacrylate, and 18.0 g purified phosphoethyl methacrylate, was added to the flask at a rate of 7.5 g/minute at a temperature of 85° C. After complete addition of the ME-2, the contents of the flask was maintained at a temperature of 85° C. for a period of 15 minutes and then cooled to room temperature. Next, 16 g ammonium hydroxide was added and the contents of the flask was filtered to remove any coagulum. The resulting comparative dispersion containing polymer particles had a solids content of 34.8 weight %, an average particle size of 106 nm, and a pH of 10.0.

In Table 2.1, the pH values for the polymerization of the phosphorus acid monomer are listed. The pH values were measured prior to and after the addition and polymerization of the monomer emulsion containing the phosphorus acid monomer. The table also lists the type of phosphorus acid monomer and indicates if the phosphorus acid monomer was purified to remove free phosphoric acid.

TABLE 2.1

Process pH values for Polymerization of Phosphorus Acid Monomer

| | Process pH (start/finish) | Phosphorus Acid Monomer |
|---|---|---|
| Example 2.1 | 1.5/1.5 | purified PEM |
| Example 2.2 | 1.7/1.6 | purified PEM |
| Example 2.3 | 1.5/1.5 | purified PEM |
| Example 2.4 | 1.5/1.5 | purified PEM |
| Example 2.5 | 1.5/1.5 | purified PEM |
| Example 2.6 | 1/1 | purified PEM |
| Example 2.7 | 1/1 | purified PEM |
| Example 2.8 | 1/1 | purified PEM |
| Example 2.9 | 1/1 | unpurified PEM |
| Example 2.10 | 1/1 | purified PEM |
| Example 2.11 | 1/1 | purified PEM |
| Example 2.12 | 1/1 | purified PEM |
| Example 2.13 | 0.8/0.8 | purified PEM |
| Example 2.14 | 1/1 | purified PEM |
| Example 2.15 | 1/1 | purified PEM |
| Example 2.16 | 1.5/1 | purified PEM |
| Example 2.17 | 1/1 | phosphorylated caprolactone 2-(methacryloyloxy)ethyl ester |
| Example 2.18 | 1/1 | phosphorylated hydroxybutyl methacrylate |
| Example 2.19 | 1/1 | mono-phosphonoethyl methacrylate |
| Example 2.20 | 1/1 | purified PEM |
| Example 2.21 | 1/1 | unpurified PEM |
| Comparative C.1 | 7.5/2.2 | unpurified PEM |
| Comparative C.2 | 7.5/2.2 | purified PEM |
| Comparative C.3 | 7.5/2.1 | purified PEM |
| Comparative C.4 | 7.5/2.2 | purified PEM |

PEM = phosphoethyl methacrylate

Preparation of Composite Particles with Adsorbed Polymer Particles Preparation of Pigment Particle Dispersion A mixture of 133.0 g of water, 8.9 g of Tamol™ 731A dispersant (Tamol is a trademark of Rohm and Haas Company), 10 g of Colloid™ 643 dispersant (Colloid is a trademark of Allied Colloids Limited Company, UK), and 5 g of 28% $NH_3$ were placed in grind pot. The contents of the grind pot were mixed on a Premier Mill dispersator equipped with a disk blade. To the grind pot, 553.5 g of TiPure™ R-706 titanium dioxide (TiPure is a trademark of E.I. DuPont de Nemours and Company) was added to the pot and ground at 2000 rpm for 20 min to prepare a titanium dioxide particle dispersion.

Example 2.1a

Aqueous Composition Containing Composite Particles

An aqueous composition containing composite particles was prepared by adding dropwise and with mixing 16.8 g of the titanium dioxide particle dispersion prepared above and 0.4 g of 28% ammonium hydroxide to 23.2 g of the aqueous dispersion of Example 2.1. The resulting aqueous composition was placed on a roller for at least 12 hours prior to formulation into a coating composition. The resulting aqueous composition had a solids level of 51.3 weight % and a pH greater than 8. The composite particles contained 63.1 weight % titanium dioxide particles and 36.9 weight % polymer particles.

Example 2.2a

Aqueous Composition Containing Composite Particles

An aqueous composition containing composite particles was prepared by adding dropwise and with mixing 40 g of the titanium dioxide particle dispersion prepared above to a mixture of 53.9 g of the aqueous dispersion of Example 2.2 and 2.8 g water. The resulting aqueous composition was placed on a roller for at least 12 hours prior to formulation into a coating composition.

Example 2.4a

Aqueous Composition Containing Composite Particles

An aqueous composition containing composite particles was prepared by adding dropwise and with mixing 38 g of the titanium dioxide particle dispersion prepared above to a mixture of 48.8 g of the aqueous dispersion of Example 2.4 and 3.8 g water. The resulting aqueous composition was placed on a roller for at least 12 hours prior to formulation into a coating composition.

Example 2.5a

Aqueous Composition Containing Composite Particles

An aqueous composition containing composite particles was prepared by adding dropwise and with mixing 38 g of the titanium dioxide particle dispersion prepared above to a mixture of 49.2 g of the aqueous dispersion of Example 2.5 and 2.4 g water. The resulting aqueous composition was placed on a roller for at least 12 hours prior to formulation into a coating composition.

Example 2.8a

Aqueous Composition Containing Composite Particles

An aqueous composition containing composite particles was prepared by adding dropwise and with mixing 40 g of the titanium dioxide particle dispersion prepared above to a mixture of 51.4 g of the aqueous dispersion of Example 2.8 and 5.3 g water. The resulting aqueous composition was placed on a roller for at least 12 hours prior to formulation into a coating composition.

Comparative Example C.1a

Comparative Aqueous Composition Containing Comparative Composite Particles

A comparative aqueous composition was prepared containing comparative composite particles using the comparative aqueous dispersion of Comparative Example C.1. These comparative polymer particles were prepared with a polymerization process at a pH above 2. The comparative aqueous composition was prepared by adding dropwise and with mixing 16.8 g of the titanium dioxide dispersion prepared above and 0.40 g of 28% ammonium hydroxide to 23.33 g of the comparative aqueous dispersion of Comparative Example C.1. The resulting comparative aqueous composition containing the comparative composite particles was placed on a roller for at least 12 hours prior to formulation into a comparative coating composition. The comparative composite particle composition of Comparative C.1a had a solids level of 53.7 weight % and a pH above 8. The comparative composite particles contained 60.2 weight % titanium dioxide particles and 39.8 weight % comparative polymer particles.

Preparation of Pigment Particle Dispersion

A mixture of 133.0 g of water, 8.9 g Tamol™ 731A dispersant (Tamol is a trademark of Rohm and Haas Company), 10 g Colloid™ 643 dispersant, and 5 g of 28% $NH_3$ were placed in grind pot. The contents of the grind pot were mixed on a Premier Mill dispersator equipped with a disk blade. To the grind pot, 553.5 g of TiPure™ R-706 titanium dioxide was added and ground at 2000 rpm for 20 min to prepare a titanium dioxide particle dispersion.

Comparative Example C.2a

Comparative Aqueous Composition Containing Comparative Composite Particles

A comparative aqueous composition containing composite particles was prepared by adding dropwise and with mixing 40.0 g of the titanium dioxide dispersion prepared above to a mixture of 53.7 g of the comparative aqueous dispersion of Comparative Example C.2 and 2.9 g water. The resulting comparative aqueous composition was placed on a roller for at least 12 hours prior to formulation into a coating composition.

Comparative Example C.3a

Comparative Aqueous Composition Containing Comparative Composite Particles

A comparative aqueous composition containing composite particles was prepared by adding dropwise and with mixing 40.0 g of the titanium dioxide dispersion prepared above to a mixture of 51.2 g of the comparative aqueous dispersion of Comparative Example C.3 and 5.4 g water. The resulting comparative aqueous composition was placed on a roller for at least 12 hours prior to formulation into a coating composition.

Comparative Example C.4a

Comparative Aqueous Composition Containing Comparative Composite Particles

A comparative aqueous composition containing composite particles was prepared by adding dropwise and with mixing 38.0 g of the titanium dioxide dispersion prepared above to a mixture of 49.9 g of the comparative aqueous dispersion of Comparative Example C.4 and 2.7 g water. The resulting comparative aqueous composition was placed on a roller for at least 12 hours prior to formulation into a coating composition.

Comparative Example C.5

Comparative Dispersion Containing Titanium Dioxide Particles and Comparative Polymer Particles A comparative dispersion was prepared containing titanium dioxide particles and comparative polymer particles. The comparative dispersion did not contain the composite particles as the comparative polymer particles were not adsorbed or covalently bonded to the titanium dioxide particles.

Preparation of Pigment Particle Dispersion

A mixture of 133.0 g of water, 8.9 g Tamol™ 731A dispersant (Tamol is a trademark of Rohm and Haas Company), 10 g Colloid™ 643 dispersant, and 5 g of 28% $NH_3$ were placed in grind pot. The contents of the grind pot were mixed on a Premier Mill dispersator equipped with a disk blade. To the grind pot, 553.5 g of TiPure™ R-706 titanium dioxide was added and ground at 2000 rpm for 20 min to prepare a titanium dioxide particle dispersion.

Preparation of Comparative Dispersion

A comparative dispersion was prepared by adding dropwise and with mixing 140 g of the titanium dioxide dispersion prepared above to 155.4 g of Rhoplex™ SG-20 polymer (Rohm and Haas Company). Rhoplex™ SG-20 polymer is supplied at 45.5 weight % solids and has an average particle diameter of 150 nm.

Example 3

Preparation of Coating Compositions and Comparative Coating Compositions

Two coating compositions containing the composite particles of Example 1.1a were prepared at 2 and 30 pigment volume concentration (PVC) by adding the ingredients in the order listed in Table 3.1.

TABLE 3.1

| Coating Compositions at 2 PVC and 30 PVC | | |
| --- | --- | --- |
| | Example 3.1 | Example 3.2 |
| Example 1.1a | 9.55 g | 143.29 g |
| Isocyanate Functional Polymer Particle Dispersion of Example 1.1 | 107.46 g | — |
| Texanol™ coalescent | 3.33 g | 2.38 g |
| Natrosol™ 250HR thickener (2.5% aqueous solution) | 12.24 g | 12.24 g |
| Water | — | 16.77 g |
| Ammonium hydroxide (28%) | 0.49 g | 0.49 g |
| Supronil™ HK Black Liquid | 0.49 g | 0.49 g |
| PVC | 2 | 30 |

(Texanol is a trademark of Eastman Chemical Corp, Kingsport, Tenn.). These two coating compositions, Examples 3.1-3.2, were then blended in various ratios, as listed in Table 3.2, to prepare coating compositions at several other pigment volume ratios.

TABLE 3.2

| Coating Compositions From Blends of Example 3.1 and 3.2 | | | | |
| --- | --- | --- | --- | --- |
| | Example 3.3 | Example 3.4 | Example 3.5 | Example 3.6 |
| Example 3.1 | 36.52 g | 33.59 g | 21.91 g | 7.30 g |
| Example 3.2 | 5.36 g | 8.93 g | 23.22 g | 41.07 g |
| PVC | 5 | 7 | 15 | 25 |

A coating composition was prepared containing the composite particles of Example 1.2a at 15 PVC. First, a master formulation was prepared by combining 416 g of Rhoplex™ AC-261 polymer dispersion, 1.92 g Supronil™ HK Black Liquid, 24 g Texanol™ coalescent, 64.8 g water, and 50 g of a 2.5 weight % aqueous solution of Natrosol™ 250HR thickener (Hercules Corp., Wilmington, Del.) while stirring on a bench top stirrer. Next, the composite particle dispersion of Example 1.2a was combined with the master formulation to prepare the coating composition of Example 3.7. A clear coating was also prepared from the master formulation, containing the ingredients listed in Table 3.3.

TABLE 3.3

| Coating Composition at 15 PVC and Clear Coating Composition | | |
| --- | --- | --- |
| | Clear Coating Composition | Example 3.7 |
| Example 1.2a | — | 36.05 g |
| Rhoplex™ AC-261 polymer dispersion | 45.27 g | — |
| Master formulation | 69.0 g | 34.81 g |
| PVC | 0 | 15 |

The coating composition of Example 3.7 and the clear coating composition were then blended in various ratios, as listed in Table 3.4, to prepare coating compositions at several other pigment volume ratios.

TABLE 3.4

| Coating Compositions From Blends of Example 3.1 and 3.2 | | | | |
| --- | --- | --- | --- | --- |
| | Example 3.8 | Example 3.9 | Example 3.10 | Example 3.11 |
| Clear Coating Composition | 8.15 g | 5.93 g | 3.70 g | 1.48 g |
| Example 3.7 | 3.64 g | 6.36 g | 9.09 g | 11.81 g |
| PVC | 4 | 7 | 10 | 13 |

A coating composition was prepared containing the composite particles of Example 2.1a at 16 PVC. First, a master formulation was prepared by combining 564.0 g of Rhoplex™ AC-261 polymer dispersion, 2.9 g Supronil™ HK Black Liquid, 35.0 g Texanol™ coalescent, 102.5 g water, and 67.7 g Natrosol 250HR thickener (3% solids in water) while stirring on a bench top stirrer. Next, the composite particle dispersion of Example 2 was combined with the master formulation to prepare the coating composition of Example 3.12. A clear coating was also prepared from the master formulation, containing the ingredients listed in Table 3.5.

TABLE 3.5

Coating Composition at 16 PVC

|  | Example 3.12 |
|---|---|
| Example 2.1a | 40.46 g |
| Master formulation | 32.17 g |
| PVC | 16 |

Coating compositions were prepared at various pigment volume concentrations by blending the composition of Example 3.12 and the master formulation, as listed in Table 3.6.

TABLE 3.6

Coating Compositions From Blends of Example 3.12 and Master Formulation

|  | Example 3.13 | Example 3.14 | Example 3.15 | Example 3.16 | Example 3.17 |
|---|---|---|---|---|---|
| Master Formulation | 57.85 g | 42.21 g | 34.24 g | 27.45 g | 13.35 g |
| Example 3.12 | 22.15 g | 37.80 g | 45.77 g | 52.55 g | 66.66 g |
| PVC | 4 | 7 | 8.6 | 10 | 13 |

Comparative coating compositions were prepared at 2 and 30 pigment volume concentration (PVC) by adding the ingredients in the order listed in Table 3.7.

TABLE 3.7

Comparative Coating Composition

|  | Comparative Example A.1 | Comparative Example A.2 |
|---|---|---|
| Comparative Example C.1a | 8.82 g | 132.27 g |
| Rhoplex ™ SG-20 polymer dispersion | 92.77 g | — |
| Texanol ™ coalescent | 3.33 g | 2.38 g |
| Natrosol ™ 250HR thickener (2.5% aqueous solution) | 12.24 g | 12.24 g |
| Water | 24.73 g | 27.79 g |
| Ammonium hydroxide (28%) | 0.49 g | 0.49 g |
| Supronil ™ HK Black Liquid | 0.49 g | 0.49 g |
| PVC | 2 | 30 |

The comparative coating compositions of Comparative Examples A.1 and A.2, were then blended in various ratios, as listed in Table 3.8, to prepare coating compositions at several other pigment volume ratios.

TABLE 3.8

Comparative Coating Compositions From Blends of Comparative Examples A.1 and A.2

|  | Comparative Example A.3 | Comparative Example A.4 | Comparative Example A.5 | Comparative Example A.6 |
|---|---|---|---|---|
| Comparative Example A.1 | 36.31 g | 33.40 g | 21.78 g | 7.26 g |
| Comparative Example A.2 | 5.36 g | 8.93 g | 23.22 g | 41.07 g |
| PVC | 5 | 7 | 15 | 25 |

A second comparative coating composition was prepared containing the comparative composite particles of Comparative Example C.2a at 16 PVC. First, a master formulation was prepared by combining 564.0 g of Rhoplex™ AC-261 polymer dispersion, 35.0 g Texanol™ coalescent, 102.5 g water, 2.9 g Supronil™ HK Black Liquid, and 67.7 g Natrosol 250HR thickener (3% solids in water) while stirring on a bench top stirrer. Next, the composite particle dispersion of Comparative Example C.2a was combined with the master formulation to prepare the coating composition of Comparative Example A.7.

TABLE 3.9

Comparative Coating Composition at 15 PVC

|  | Comparative Example A.7 |
|---|---|
| Comparative Example C.2a | 40.46 g |
| Master formulation | 32.17 g |
| PVC | 16 |

The comparative coating composition of Comparative Example A.7 and the master formulation were then blended in various ratios, as listed in Table 3.10, to provide coating compositions at several other pigment volume ratios.

TABLE 3.10

Comparative Coating Compositions From Blends of Comparative Example A.7 and Master Formulation

|  | Comparative Example A.8 | Comparative Example A.9 | Comparative Example A.10 | Comparative Example A.11 |
|---|---|---|---|---|
| Master Formulation | 57.9 g | 42.2 g | 27.5 g | 13.4 g |
| Comparative Example A.7 | 22.2 g | 37.8 g | 52.6 g | 66.7 g |
| PVC | 4 | 7 | 10 | 13 |

Example 3.18 and Comparative Example A.12

A master formulation was prepared by combining 329.8 g of Rhoplex™ AC-261 polymer dispersion, 1.7 g Supronil™ HK Black Liquid, 27.7 g Texanol™ coalescent, 58.2 g water, and 42.6 g Natrosol 250HR thickener (2.5% solids in water) while stirring on a bench top stirrer. Next, the aqueous composition of Example 2.8a was combined with the master formulation to prepare the coating composition of Example 3.18. A comparative coating composition was prepared from the comparative aqueous composition of Comparative Example C.3a.

TABLE 3.5

Preparation of Coating Composition and
Comparative Coating Composition

|  | Example 3.18 | Comparative Example A.12 |
|---|---|---|
| Master Formulation | 35.2 g | 35.2 g |
| Example 2.8a | 45.0 g |  |
| Comparative Example C.3a |  | 45.0 g |
| PVC | 16 | 16 |

Example 3.19 and Comparative Example A.13

A master formulation was prepared by combining 659.6 g of Rhoplex™ AC-261 polymer dispersion, 3.42 g Supronil™ HK Black Liquid, 41.55 g Texanol™ coalescent, 116.4 g water, and 85.2 g Natrosol 250HR thickener (2.5% solids in water) while stirring on a bench top stirrer. Next, the aqueous composition of Example 2.3 was combined with the master formulation to prepare the coating composition of Example 3.19. A comparative coating composition was prepared from the comparative aqueous composition of Comparative A.13.

TABLE 3.6

Preparation of Coating Composition and
Comparative Coating Composition

|  | Example 3.19 | Comparative Example A.13 |
|---|---|---|
| Master Formulation | 36.53 g | 36.53 g |
| Example 2.2a | 50.0 g |  |
| Comparative Example C.2a |  | 50.0 g |
| PVC | 16 | 16 |

Examples 3.20-3.21 and Comparative A.14

A master formulation was prepared by combining 372.7 g of Rhoplex™ AC-261 polymer dispersion, 1.90 g Supronil™ HK Black Liquid, 23.15 g Texanol™ coalescent, 67.72 g water, and 44.72 g Natrosol 250HR thickener (2.5% solids in water) while stirring on a bench top stirrer. Next, the aqueous compositions of Example 2.4a and Example 2.5a were each combined with the master formulations to prepare the coating compositions of Example 3.20 and Example 3.21, respectively. A comparative coating composition was prepared from the comparative aqueous composition of Comparative C.4a.

TABLE 3.7

Preparation of Coating Compositions and
Comparative Coating Composition

|  | Example 3.20 | Example 3.21 | Comparative Example A.14 |
|---|---|---|---|
| Master Formulation | 32.2 g | 32.2 g | 32.2 g |
| Example 2.4a | 40.0 g |  |  |
| Example 2.5a |  | 40.0 g |  |
| Comparative Example C.4a |  |  | 40.0 g |
| PVC | 16 | 16 | 16 |

Example 4

Preparation and Evaluation of Coated Samples

Preparation of Coated Samples:

Coated samples were prepared by applying a 76 micron (3 mil) thick wet film of the coating composition onto Opacity Charts (The Leneta Company, Form 3B) with a Bird blade (MED Industries) and allowing the wet film to dry at 20° C. and 20% relative humidity for at least 12 hours.

Determination of Scattering Coefficients:

The Y-reflectance value of the coated sample was measured over the black part of the chart with a Pacific Scientific Colorguard colorimeter (Gardner Ineotec). The reported Y-reflectance value is an average of three measurements. Scattering coefficients were calculated using the equation $$S = 2.578 * Y/(1-Y)^2,$$

where Y represents the Y-reflectance value and the value of 2.578 for the constant coefficient was selected to provide a 2 PVC coating with a scattering coefficient of 1.000. Table 4.1 lists the Y-reflectance values and the calculated scattering coefficients for the coating compositions and the comparative coating compositions with PVC values in the range of 2 to 30.

TABLE 4.1

Y-Reflectance Values and Scattering Coefficients
for Coatings Prepared from Coating Compositions
and Comparative Coating Compositions

| Coating Composition | Y-Reflectance Value | Scattering Coefficient | PVC | Comments |
|---|---|---|---|---|
| Example 3.1 | 0.2310 | 1.000 | 2 | Example 1.1a |
| Example 3.3 | 0.3720 | 2.432 | 5 |  |
| Example 3.4 | 0.4315 | 3.441 | 7 |  |
| Example 3.5 | 0.5665 | 7.771 | 15 |  |
| Example 3.6 | 0.6530 | 13.98 | 25 |  |
| Example 3.2 | 0.6710 | 15.96 | 30 |  |
| Example 3.8 | 0.4150 | 3.126 | 4 | Example 1.2a |
| Example 3.9 | 0.5080 | 5.410 | 7 |  |
| Example 3.10 | 0.5668 | 7.786 | 10 |  |
| Example 3.11 | 0.6030 | 9.863 | 13 |  |
| Example 3.7 | 0.6160 | 10.77 | 15 |  |
| Example 3.13 | 0.398 | 1.098 | 4 | Example 2.1a |
| Example 3.14 | 0.491 | 1.895 | 7 |  |
| Example 3.15 | 0.520 | 2.257 | 8.6 |  |
| Example 3.16 | 0.547 | 2.666 | 10 |  |
| Example 3.17 | 0.585 | 3.397 | 13 |  |
| Example 3.12 | 0.611 | 4.038 | 16 |  |
| Comparative Example A.1 | 0.2300 | 1.000 | 2 | Comparative C.1a |
| Comparative Example A.3 | 0.3790 | 2.533 | 5 |  |
| Comparative Example A.4 | 0.4300 | 3.412 | 7 |  |
| Comparative Example A.5 | 0.5220 | 5.889 | 15 |  |
| Comparative Example A.6 | 0.5640 | 7.648 | 25 |  |
| Comparative Example A.2 | 0.5660 | 7.748 | 30 |  |
| Comparative Example A.8 | 0.396 | 1.085 | 4 | Comparative C.2a |
| Comparative Example A.9 | 0.482 | 1.796 | 7 |  |
| Comparative Example A.10 | 0.532 | 2.429 | 10 |  |
| Comparative Example A.11 | 0.565 | 2.986 | 13 |  |
| Comparative Example A.7 | 0.589 | 3.487 | 16 |  |

The hiding efficiencies provided by the titanium dioxide particles in the coatings in Table 4.1 were determined by fitting the values for the scattering coefficients and the pigment volume concentration of the titanium dioxide to the following equation:

$$S = AV(1 - BV^{1/3})$$

where S represents the scattering coefficient, V represents the pigment volume concentration of the titanium dioxide, and A and B are constants. Values of B were determined for the coatings containing the composite particles of Example 1.1a, Example 1.2a, Example 2a, the comparative composite particles of Comparative Example C.2a, and the titanium dioxide particles of Comparative Example C.5.

TABLE 4.2

Values of B for Coatings Prepared from Coating Compositions and Comparative Coating Compositions

| Coating Composition | B | Comments |
| --- | --- | --- |
| Examples 3.1-3.6 | −0.07 ± 0.06 | composite particles of Example 1.1a |
| Examples 3.7-3.11 | 0.099 ± 0.035 | composite particles of Example 1.2a |
| Examples 3.12-3.17 | 0.08 ± 0.01 | composite particles of Example 2.1a |
| Comparative Examples A.1-A.6 | 0.22 ± 0.01 | titanium dioxide particles of Comparative Example C.1a |
| Comparative Examples A.7-A.11 | 0.17 ± 0.005 | comparative composite particles of Comparative Example C.2a |
| Literature value for titanium dioxide particles | 0.23 | TiPure ™ titanium dioxide particle |

The results in Table 4.2 show that the coatings of this invention, as exemplified by Examples 3.1-3.17, have B values of less than or equal to 0.15. This indicates that the titanium dioxide pigment particles in these coatings have scattering coefficients with a linear or quasi-linear relationship to the pigment volume concentration of the titanium dioxide particles contained in the coatings. In comparison, the comparative coatings have significantly lower levels of hiding. The B values for the titanium dioxide contained in the comparative coatings were greater than 0.15. The coating with titanium dioxide particles that were not contained in composite particles, had the largest value for B, indicating significant crowding of the titanium dioxide particles and loss of hiding efficiency.

The Y-reflectance values were also measured for the coatings prepared from Examples 3.18-2.21 and Comparative Examples A.12-A.14. A difference of 0.2 units or greater in the Y-reflectance values was visually discernible and was considered to be significant.

The Y-values for coatings prepared from Example 3.18 and Comparative Example A.12 were measured to be 67.2 and 65.8, respectively. The polymer particles contained in Example 3.18 and the comparative polymer particles of Comparative Example A.12 had the same polymer composition. The polymer particles of Example 3.18 were prepared by the low pH process of this invention. The comparative polymer particles of Comparative Example A.12 were prepared by a polymerization process at a pH above 2.

The Y-values for coatings prepared from Example 3.19 and Comparative Example A.13 were measured to be 68.0 and 66.6, respectively. The polymer particles contained in Example 3.19 and the comparative polymer particles of Comparative Example A.13 had the same polymer composition. The polymer particles contained in Example 3.19 were prepared by the low pH process of this invention. The comparative polymer particles contained in Comparative Example A.13 were prepared by a polymerization process at a pH above 2.

The Y-values for coatings prepared from Example 3.20, Example 3.21, and Comparative Example A.14 were measured to be 67.1, 67.0, and 66.3, respectively. The polymer particles contained in Example 3.20, Example 3.21, and the comparative polymer particles of Comparative Example A.14 had the same polymer composition. The polymer particles contained in Example 3.20 and Example 3.21 were prepared by the low pH process of this invention. The comparative polymer particles contained in Comparative Example A.14 were prepared by a polymerization process at a pH above 2.

The results show that the polymer particles prepared by a polymerization process of this invention provided a coating with higher level of hiding that a comparative coating containing polymer particles prepared by a polymerization process having a pH above 2.

What is claimed is:

1. A composite particle comprising:
    a) a pigment particle;
    b) a first plurality of polymer particles; and
    c) a second plurality of coupling agents, such that each one of the second plurality of coupling agents is covalently bonded to the pigment particle and to a corresponding one of the first plurality of polymer particles;
    wherein the coupling agent has a first functional group that reacts with the pigment particle to form a first covalent bond with the pigment particle, and a second functional group that reacts with a complementary functional group of the polymer particle to form a second covalent bond; and
    wherein:
    the first functional group of the coupling agent is selected from alkoxysilane, acyloxysilane, and silanols;
    the second functional group of the coupling agent is selected from isocyanate, isothiocyanate, aldehyde, acetoacetoxy, epoxide, thiorane, aziridine, carbodiimide, haloalkyl, halomethylphenyl, thiol, and carboxylic acid; and
    the complementary functional group of the polymer particles is selected from acetoacetoxy, 1,3-dicarbonyl, aldehyde, acid, amine, epoxide, isocyanate, alcohol, carbodiimide, aziridine, haloalkyl, and halophenyl.

2. A composite particle comprising:
    a) a pigment particle;
    b) a first plurality of polymer particles; and
    c) a second plurality of coupling agents, such that each one of the second plurality of coupling agents is covalently bonded to the pigment particle and to a corresponding one of the first plurality of polymer particles;
    wherein the coupling agent is selected from an epoxysilane, a mercaptosilane, a haloalkylsilane, an isothiocyanatosilane, an alcohol-functional silane, a halomethylphenylsilane, a carbodiimide silane, an aldehyde-functional silane, and a 1,3-diketone functional silane.

3. The composite particle of claim 1 wherein the coupling agent is selected from (propyltrimethoxysilane)sulfide terminated methyl methacrylate-acrolein copolymer; (propyltrimethoxysilane)sulfide terminated methyl methacrylate-butyl acrylate-2-hydroxyacetaldehyde ester of methacrylic acid copolymer and (butyltriethoxysilane)sulfide terminated methyl methacrylate-butyl acrylate-acetoacetoxyethyl methacrylate copolymer.

4. The composite particle of claim 1 wherein:
    the second functional group is selected from isocyanate and isothiocyanate, and the complementary functional group is selected from alcohol, amine, urea, and anhydride;
    the second functional group is selected from aldehyde, and the complementary functional group is selected from acetoacetoxy and amine;

the second functional group is selected from acetoacetoxy, and the complementary functional group is selected from aldehyde and amine;

the second functional group is selected from epoxide, thiorane, and aziridine, and the complementary functional group is selected from alcohol, carboxylic acid, anhydride, amine, and mercaptan;

the second functional group is carbodiimide, and the complementary functional group is selected from carboxylic acid, alcohol, amine, and mercaptan;

the second functional group is selected from haloalkyl and halomethylphenyl, and the complementary functional group is selected from amine and carboxylic acid;

the second functional group is selected from thiol, and the complementary functional group is selected from epoxide, aziridine, thiorane, acetoacetoxy, isocyanate, isothiocyanate, and carbodiimide; or the second functional group is carboxylic acid, and the complementary functional group is selected from epoxide, aziridine, thiorane, and carbodiimide.

5. A composite particle comprising:
a) a pigment particle;
b) a first plurality of polymer particles; and
c) a second plurality of coupling agents, such that each one of the second plurality of coupling agents is covalently bonded to the pigment particle and to a corresponding one of the first plurality of polymer particles;
wherein the coupling agent is oligomeric.

6. A coating comprising:
a) pigment particles having an average particle diameter of up to about 1 micron; and
b) a polymer matrix for at least partially containing said pigment particles; said pigment particles having a crowding factor B value in the range of from 0 to 0.15, wherein B is described by the Kubelka-Munk light scattering equation:

$$S = AV(1 - BV_{eff}^{1/S})$$

for which:
S is the light scattering coefficient
V is the pigment volume concentration of said pigment particles
$V_{eff}$ is the effective pigment volume concentration of said pigment particles;
A is a constant with a value greater than 0; and
B is a constant related to the crowding of said pigment particles; and
wherein the pigment volume concentration of said pigment particles is in the range of about 5 to about 40;
wherein said pigment particles are present as composite particles; and
wherein each of said composite particles comprises:
i) one of said pigment particles; and
ii) a first plurality of polymer particles; and
iii) a second plurality of coupling agents, such that each one of said second plurality of coupling agents is covalently bonded to said pigment particle and to a corresponding one of said first plurality of polymer particles;
wherein the coupling agent has a first functional group that reacts with the pigment particle to form a first covalent bond with the pigment particle, and a second functional group that reacts with a complementary functional group of the polymer particle to form a second covalent bond; and
wherein the first functional group of the coupling agent is selected from alkoxysilane, acyloxysilane, and silanols;
the second functional group of the coupling agent is selected from isocyanate, isothiocyanate, aldehyde, acetoacetoxy, epoxide, thiorane, aziridine, carbodiimide, haloalkyl, halomethylphenyl, thiol, and carboxylic acid; and
the complementary functional group of the polymer particle is selected from acetoacetoxy, 1,3-dicarbonyl, aldehyde, acid, amine, epoxide, isocyanate, alcohol, carbodiimide, aziridine, haloalkyl, and halophenyl.

7. The composite particle of claim 1 wherein the pigment particle is titanium dioxide.

8. The composite particle of claim 1 wherein the complementary functional group is selected from at least one of an aziridine, an epoxide, and a thiorane.

9. The composite particle of claim 1 wherein the polymer particles are attached to the pigment particle by ether or thiol ether bonds.

10. The composite particle of claim 1 wherein the coupling agent covalently bonds to said first plurality of polymer particles by at least one functionality selected from ester, amide, ether, urethane, thiol ether, amine and ureido.

11. The composite particle of claim 1 wherein each one of the second plurality of reacted coupling agents are bonded to one or more atom on or at the surface of the pigment particle by bonds selected from ether bonds, thiol ether bonds, and siloxane ether bonds.

12. The composite particle of claim 1 wherein the atom on or at the surface of the pigment particle is selected from the group consisting of Ti, Al, Zr, Si, Zn, Cr, Sn, Fe, C, and Pb.

13. The composite particle of claim 1 wherein the pigment particle is selected from zinc oxide, antimony oxide, zirconium oxide, chromium oxide, iron oxide, lead oxide, zinc sulfide, lithopone, anatase titanium dioxide, and rutile titanium dioxide.

14. The composite particle of claim 1 wherein the pigment particle is rutile titanium dioxide.

* * * * *

UNITED STATES PATENT AND TRADEMARK OFFICE
CERTIFICATE OF CORRECTION

PATENT NO. : 8,822,569 B2  
APPLICATION NO. : 11/363438  
DATED : September 2, 2014  
INVENTOR(S) : John Keith Bardman and Ward Thomas Brown Page 1 of 1

It is certified that error appears in the above-identified patent and that said Letters Patent is hereby corrected as shown below:

On the title page of the patent, under "Related U.S. Application Data", item (60), delete "provisional application No. 60/377,395, filed on May 3, 2002" and insert --provisional application No. 60/377,975, filed on May 7, 2002--

In the Specification

Column 1, Line 13, delete "60/377,395" and insert --60/377,975--

Signed and Sealed this  
Second Day of June, 2015

Michelle K. Lee  
*Director of the United States Patent and Trademark Office*